(12) United States Patent
Furuya et al.

(10) Patent No.: US 7,301,942 B2
(45) Date of Patent: Nov. 27, 2007

(54) METHOD FOR DETERMINING COMBINATION OF DATA FOR TRANSFER, AND COMBINATION DETERMINING CIRCUIT

(75) Inventors: Shinji Furuya, Tokyo (JP); Hirotoshi Yamada, Tokyo (JP); Nobuyuki Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 928 days.

(21) Appl. No.: 10/284,383

(22) Filed: Oct. 31, 2002

(65) Prior Publication Data
US 2003/0108037 A1    Jun. 12, 2003

(30) Foreign Application Priority Data
Dec. 12, 2001    (JP) .............................. 2001-379129

(51) Int. Cl.
*H04Q 11/00*    (2006.01)
(52) U.S. Cl. ....................................... 370/380; 370/388
(58) Field of Classification Search ........ 370/380–383, 370/388
See application file for complete search history.

(56) References Cited

U.S. PATENT DOCUMENTS

| | | | |
|---|---|---|---|
| 5,299,190 A | 3/1994 | LaMaire et al. | |
| 5,500,858 A | 3/1996 | McKeown | |
| 6,034,956 A * | 3/2000 | Olnowich et al. | 370/388 |
| 6,370,148 B1 * | 4/2002 | Calvignac et al. | 370/412 |
| 6,633,568 B1 * | 10/2003 | Han et al. | 370/395.4 |
| 6,904,047 B2 * | 6/2005 | Han et al. | 370/414 |

FOREIGN PATENT DOCUMENTS

| | | |
|---|---|---|
| JP | 6-233337 A | 8/1994 |
| JP | 11-205326 A | 7/1999 |
| JP | 2000-50373 A | 2/2000 |

OTHER PUBLICATIONS

Pattabhiraman et al., IEEE Journal on Selected Areas in Communications, vol. 17, No. 6, pp. 1057-1066, (Jun. 1999), XP011054974.

(Continued)

*Primary Examiner*—Chau Nguyen
*Assistant Examiner*—Marcus R Smith
(74) *Attorney, Agent, or Firm*—Birch, Stewart, Kolasch & Birch, LLP

(57) ABSTRACT

A method for determining a combination of data for transfer comprises counting the number of candidates in data for candidates of a data transfer request for each row as the number of candidates at lattice points of a lattice composed of N rows×N columns, searching for a minimum value out of count values equal to or greater than 1, selecting and storing one row showing the minimum value. Regarding the candidates in the selected row, the method also comprises counting the number of candidates in each column where candidates exist, searching for a minimum value, selecting and storing one column, deleting all candidates on the row and the column determined, and repeating these processes until no more candidates exist to determine combinations of rows and columns stored at a point of time when no more candidates exist.

35 Claims, 14 Drawing Sheets

OTHER PUBLICATIONS

Fangyu et al., Parallel and Distributed Systems, pp. 157-164, (Jun. 26, 2001), XP011054974.

Nong et al., IEEE Communications Magazine, IEEE Service Center, vol. 38, No. 12, pp. 62-69 (Dec. 2000) XP011091392.

Goudreau et al., Proceedings IEEE Infocom 2000, The Conference on Computer Commun., vol. 3 of 3, Conf. 19, pp. 1634-1643 (Mar. 26, 2000) XP001044259.

McKeown et al., Computer Networks and ISDN Systems, North Holland Publishing, Amsterdam, NL., vol. 30, No. 24, pp. 2309-2326 (Dec. 14, 1998).

Kawarai, Ken-ichi et al.: The 1998 Communications Society Conference, B-6-20, Institute of Electronics, Information and Communication Engineers, Sep. 7, 1998 (Sep. 7, 1998).

* cited by examiner

FIG.1A
LATTICE POINTS OF N ROWS X N COLUMNS
FIG.1B
STATUS THAT THERE ARE CANDIDATES AT LATTICE POINTS OF 4 ROWS X 4 COLUMNS
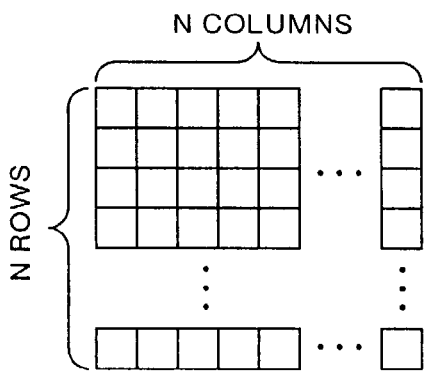
FIG.1C
PERMUTATION COMBINATION PATTERNS OF FOUR ROWS X FOUR COLUMNS
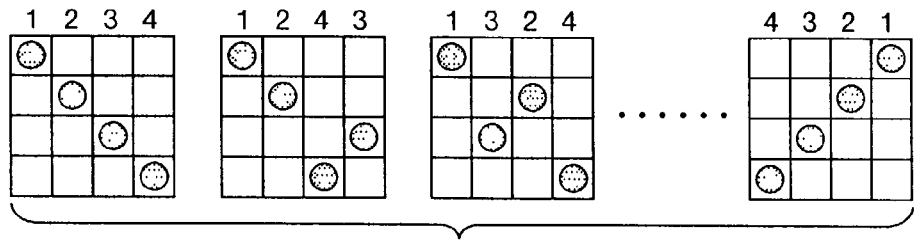
4! = 24 WAYS
FIG.1D
LOGICAL PRODUCTS OF CANDIDATES OF FIG.1B AND ALL PATTERNS OF FIG.1C
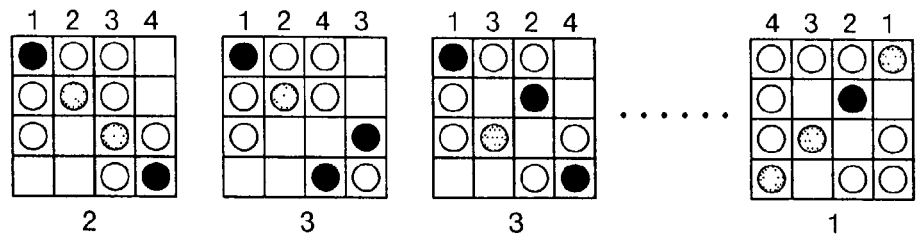
※ COUNT NUMBER OF ● THAT IS SUPERIMPOSITION OF ◎ AND ○
FIG.1E
AS A RESULT OF FIG.1D, FOLLOWING TWO SETS HAVE MAXIMUM NUMBER [4]
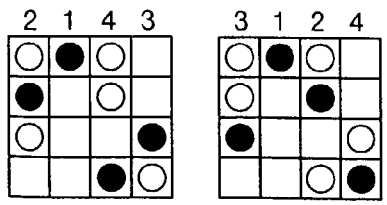

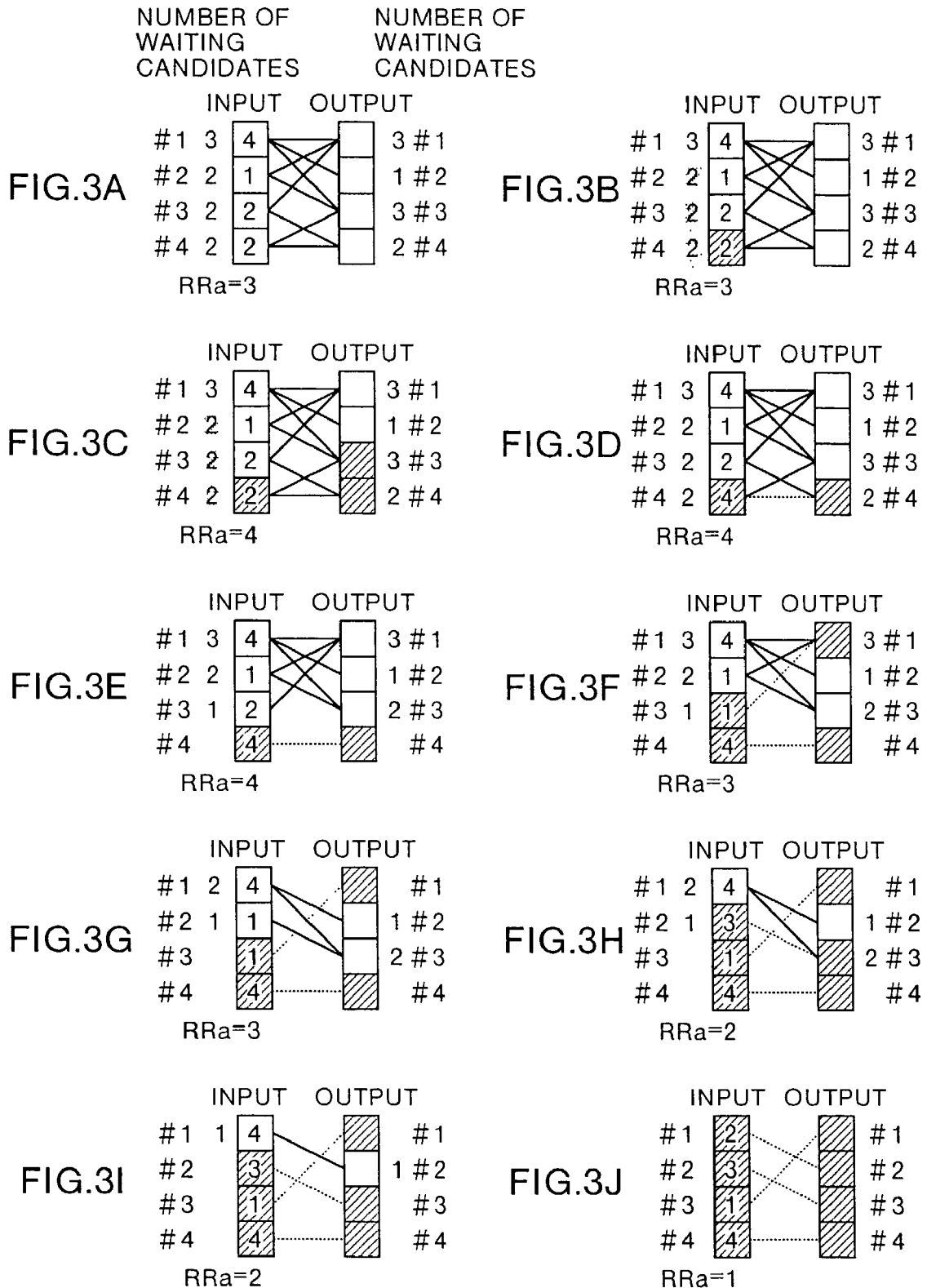

FIG.7

| i | $((N+i-s-1) \% N)+1$ |
|---|---|
| 1 | $N-s+1$ |
| 2 | $N-s+2$ |
| 3 | $N-s+3$ |
| ... | |
| LOWEST PRIORITY → s | N |
| HIGHEST PRIORITY → s+1 | 1 |
| s+2 | 2 |
| ... | |
| N-1 | $N-s-1$ |
| N | $N-s$ |

FIG.8

| cLineR [n:1] | $((cLineR[n:1]+s-1) \% N)+1$ |
|---|---|
| $N-s+1$ | 1 |
| $N-s+2$ | 2 |
| $N-s+3$ | 3 |
| ... | |
| N | s |
| 1 | s+1 |
| 2 | s+2 |
| ... | |
| $N-s-1$ | $N-1$ |
| $N-s$ | N |

FIG.12

| DESTINATION OUTPUT PORT | #1 | 2 | 3 | 4 | 5 | 6 | 7 | 8 | TOTAL |
|---|---|---|---|---|---|---|---|---|---|
| INPUT PORT #1 | 7 | 4 | 8 | 1 | 6 | 5 | 2 | 3 | 36 |
| #2 | 4 | 1 | 5 | 6 | 3 | 2 | 7 | 8 | 36 |
| #3 | 8 | 5 | 1 | 2 | 7 | 6 | 3 | 4 | 36 |
| #4 | 5 | 2 | 6 | 7 | 4 | 3 | 8 | 1 | 36 |
| #5 | 6 | 3 | 7 | 8 | 5 | 4 | 1 | 2 | 36 |
| #6 | 2 | 7 | 3 | 4 | 1 | 8 | 5 | 6 | 36 |
| #7 | 1 | 6 | 2 | 3 | 8 | 7 | 4 | 5 | 36 |
| #8 | 3 | 8 | 4 | 5 | 2 | 1 | 6 | 7 | 36 |
| TOTAL | 36 | 36 | 36 | 36 | 36 | 36 | 36 | 36 | |

FIG.13

| TRAFFIC DATA | PRESENT INVENTION | RR |
|---|---|---|
| ABANDON RATE (95% RELIABLE SECTOR) —UNIFORM | −3.84 (0.11) | −3.91 (0.10) |
| ABANDON RATE (95% RELIABLE SECTOR) —NONUNIFORM | −4.27 (0.17) | −1.48 (0.00) |
| DETERMINATION RATE (95% RELIABLE SECTOR) —UNIFORM | 98.9834 (0.0096) | 98.9849 (0.0089) |
| DETERMINATION RATE (95% RELIABLE SECTOR) —NONUNIFORM | 98.9921 (0.0096) | 95.7378 (0.0086) |
| INPUT TRAFFIC AVERAGE (COMMON TO ALL) | 98.9994 (0.0009) | |

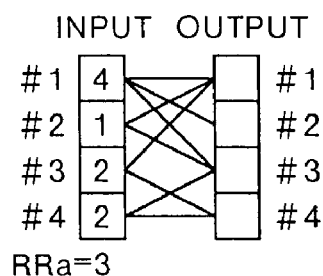
FIG.14A
FIG.14B
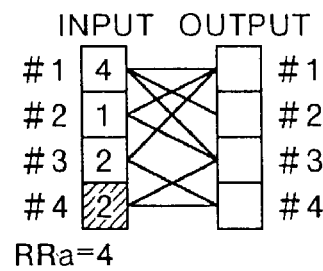
FIG.14C
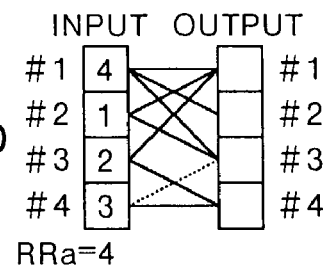
FIG.14D
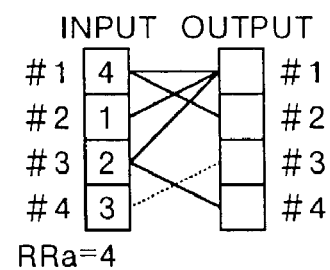
FIG.14E
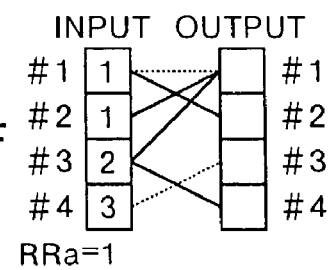
FIG.14F
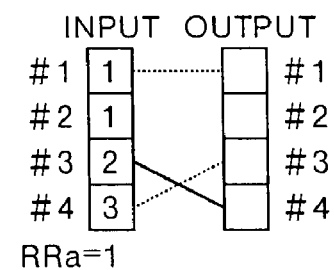
FIG.14G
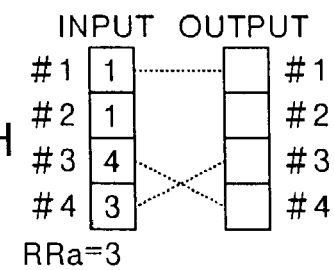
FIG.14H

US 7,301,942 B2

METHOD FOR DETERMINING COMBINATION OF DATA FOR TRANSFER, AND COMBINATION DETERMINING CIRCUIT

BACKGROUND OF THE INVENTION

1) Field of the Invention

The present invention relates to a method for determining combination of data to be transferred and a combination determining circuit that are applied to an input buffer type or input/output butter type communication switching apparatus that executes N×N data switching. More particularly, this invention relates to the method for determining combination of data to be transferred and the combination determining circuit that use a novel algorithm capable of executing a data transfer of higher data transfer capacity than that of a round-robin system generally used for arbitration of data switching.

2) Description of the Related Art

When a communication apparatus that realizes N×N data switching has a switching architecture called an input buffer type or an input/output buffer type, a combination determination algorithm for this data switching is required to have a function of searching for a combination of N input lines and N output lines that are related as one to one. In other words, at a one-time data transfer, it is possible to transfer maximum N data for the whole switching apparatus, that is, only one data per each line. Therefore, for each input line, it is necessary to confirm which data is waiting for a transfer to which output line, and executed at a transfer as much as possible in the combination of data waiting for a transfer each time. Otherwise, it is not possible to maintain the transfer capacity of the whole switching apparatus at a high level.

For the arbitration of this type of data switching, the round-robin system (hereinafter to be referred to as the RR system) is used often. The round-robin system arbitrates requesters that are to be handled basically evenly to give them rights of making even access to shared resources such as lines, shared areas, and buses.

In the application of the RR system to the N×N data switching, conventionally, it has been general to use an algorithm that executes the RR system at the output line side and the input line side respectively (for example, "A study on scheduling algorithms for input buffered ATM switches", The Institute of Electronics, Information and Communication Engineers, 1998 Society Conference, B-6-20).

An arbitration algorithm using a sequential round-robin (SRR) system is disclosed in this conventional art. According to the SRR system, priority is given to each input line, and an input line having a highest priority selects one output line out of requested output lines by using a pointer value held in each input line based on the RR system, and the pointer value is updated. An input line having a next priority order selects one output line from among undetermined output lines in a similar manner by using a pointer value. This process is repeated for all the input lines. At the next time, an input line having a highest priority is shifted according to the RR system, and a similar process is carried out.

The RR system according to this conventional art will be explained using a 4×4 switching apparatus shown in FIG. 14A to FIG. 14H. Assume that there is a combination of data transfer waiting as shown in FIG. 14A. In other words, an input line # 1 has requests to output lines # 1, # 2, and # 3, an input line # 2 has requests to output lines # 1 and # 3, an input line # 3 has requests to output lines # 1 and # 4, and an input line # 4 has requests to output lines # 3 and # 4. This status is replaced with a model of lattice points as shown in FIG. 14B.

In FIG. 14A, it is assumed that the last determination result RRa=3 in the RR for determining an input line, and that the last determination result (a pointer value) RRb is [4] for # 1, [1] for # 2, [2] for # 3, and [2] for # 4 in the RR for determining an output line in each input line.

First, as the last RR value that determines an input line is RRa=3, the input line # 4 becomes a line having a highest priority. As the input line # 4 has data (candidates) that waits for being transferred ("transfer-waiting data"), the input line # 4 is selected. As the input line # 4 has been selected, [4] is loaded on RRa as the RR value that determines an input line, and RRa=4 is stored (FIG. 14C).

Next, the input line # 4 determines an output line. As the pointer value RRb of the input line # 4 is 2, the output line # 3 is looked at first. As data destined to the output line # 3 exists, a combination of the input line # 4 and the output line # 3 (a dotted line) is first determined. As the output line # 3 has been selected, [3] is loaded on the RRb as the pointer value of the input line # 4, and RRb=3 is stored (FIG. 14D).

Next, as shown in FIG. 14E, as it is no more possible to select candidates of transfer-waiting data relating to the input line # 4 and the output line # 3, all are deleted. Here, combinations of the input line # 4—the output line # 4, the input line # 1—the output line # 3, and the input line # 2—the output line # 3 are deleted.

Next, as shown in FIG. 14F, a combination of the input line # 1 and the output line # 1 is determined in a similar manner. Then, as shown in FIG. 14G, all candidates of transfer-waiting data that have become unable to be selected are deleted. Here, combinations of the input line # 2—the output line # 1, the input line # 3—the output line # 1, and the input line # 1—the output line # 2 are deleted.

Last, as shown in FIG. 14H, a combination of the input line # 3 and the output line # 4 is determined. As there is no more unselected candidate, the combination determination process is completed. As a result, three candidates are selected, and it is possible to transfer three data at the next data transfer.

According to the algorithm using the above conventional RR system, only three combinations are obtained in the 4×4 switching. However, in the combinations of transfer-waiting data shown in FIG. 14B, there actually exist two combinations each selecting all of the four input and output lines as shown in FIG. 15A and FIG. 15B. In FIG. 15A and FIG. 15B, black circles show finally selected combinations of input and output lines.

As explained above, according to the above conventional RR system, it is not possible to find any one of the combinations shown in FIG. 15A and FIG. 15B. Despite the fact that four data can be transferred, only three data have been given a data transfer opportunity.

Of course, in the conventional RR system, the combinations shown in FIG. 15A and FIG. 15B may also be obtained depending on a result of the last RR determination. However, there is a problem that this all depends on the last RR determination result. In the above combinations of transfer-waiting data, the probability that three data are determined is 51.2%, and the probability that four data are determined is 48.8%, as a result of trial combinations of the last determination results in all RR. It is possible to obtain these probabilities by making a trial run of combinations of the last determination results in all RR utilizing a computer. A concrete result is that the probability that three data are selected is 524/1024, and the probability that four data are selected is 500/1024. Numerical values of 1 to 4 are valid for RR values and pointer values, and one exists for determining an input line, and four exist for determining an output line, totaling five. Therefore, $4^5=1024$ is the number of combination patterns of all RR values.

It is assumed that the RR process is executed again, utilizing a result of the RR value shown in FIG. 14H as it is when combinations of transfer-waiting data are the same as shown in FIG. 14A to FIG. 14H. Then, four combinations of data transfers in FIG. 15B are obtained as shown in FIG. 16A. When the process is further executed in the same pattern, three combinations of data transfers as shown in FIG. 16B are obtained. In other words, when the same combination patterns continue successively, three combinations of data transfers are applied immediately after four combinations of data transfers have been found. Based on this, it is not possible to maintain the transfer capacity of the switching apparatus at a high level.

FIG. 17A to FIG. 17H show processes up to the result of that shown in FIG. 16A in detail. In the processes shown in FIG. 17A to FIG. 17H, the number of data transfer candidates that are to be deleted at the stage of selecting an output line for each input line is as follows.

Input line # 4-Output line # 4 (FIG. 17A→FIG. 17C): two
Input line # 1-Output line # 2 (FIG. 17D→FIG. 17E): two
Input line # 2-Output line # 3 (FIG. 17F→FIG. 17G): one On the other hand, in the process shown in FIG. 14A to FIG. 14H, the following results are obtained.

Input line # 4-Output line # 3 (FIG. 14D→FIG. 14E): three
Input line # 1-Output line # 1 (FIG. 14F→FIG. 14G): three As explained above, up to the stage of determining combinations of two sets of input and output lines, four lines are deleted in FIG. 17A to FIG. 17H and six lines are deleted in FIG. 14A to FIG. 14H, in addition to the determined candidates. In the example shown in FIG. 14A to FIG. 14H, there exist lines having no candidates at the stage where three candidates have been deleted in FIG. 14G. In conclusion, a large number of lines deleted means that there remain a small number of candidates as the determination of input and output lines proceeds. In other words, as the number of remaining candidates becomes smaller, the probability that combinations of more input and output lines are obtained is lowered.

In the RR system, the deleted number of candidates of transfer-waiting data does not become a factor or one of factors for determining combinations of input and output lines. As the last determination result is everything, even when four combinations of transfer-waiting data are in the status capable of being selected, whether the four combinations of transfer-waiting data are actually selected or not entirely depends on probabilities, or chance.

As explained above, the RR system is not suitable for solving the task of "selecting a maximum number of lattice points under the condition that when there are $N^2$ lattice points of N rows×N columns and an optional lattice point is selectable from these lattice points, it is possible to select only one candidate as a maximum in each row and in each column of the N rows×N columns", that is required for this type of data switching. Therefore, employment of the RR system in the combination determination algorithm in the communication switching apparatus having the architecture of the input buffer type or the input and output buffer type, means that it is impossible to maintain the data transfer capacity of the switching apparatus at a high level.

SUMMARY OF THE INVENTION

It is an object of this invention to provide a method for determining a combination of data to be transferred and a combination determining circuit having a novel algorithm capable of maintaining data switching capacity at a high level.

According to one aspect of this invention, there is provided the method for determining a combination of data to be transferred at the time of transferring the data from N input lines to N output lines by using transfer request candidate data that shows candidates of data transfer requests in the N input lines with respect to the N output lines. The method comprises a first step of expressing the data transfer request candidate data in N×N bits, and obtaining logical products of the data transfer request candidate data of N×N bits and permutation combination data of N×N bits that expresses all permutation combination patterns from 1 to N respectively, and a second step of searching for permutation combination patterns in which a number of candidates that take logical products becomes a maximum, and determining one of these patterns as a combination of data for transfer used when the data transfer is executed.

According to another aspect of this invention, there is provided the method for determining a combination of data to be transferred at the time of transferring the data from N input lines to N output lines by using transfer request candidate data that shows candidates of data transfer requests in the N input lines with respect to the N output lines. The method comprises a first step of counting for each row and each column a number of candidates in the data transfer request candidate data as a number of candidates at lattice points of a lattice composed of N rows×N columns, and a second step of searching for a minimum value out of count values that are equal to or greater than 1 as a result of the counting, and selecting and storing one row or column that shows the minimum value. The method also comprises, regarding candidates in the selected row or column, a third step of searching for a minimum value out of numbers of candidates in columns or rows in which the candidates exist, and selecting and storing one column or row that shows the minimum value, and a fourth step of deleting all candidates on the row and candidates on the column determined in the second step and the third step. The first to fourth steps are repeated until no more candidates exist, and combinations of rows and columns stored at a point of time when no more candidates exist are determined as combinations of data for transfer used when the data transfer is executed.

According to still another aspect of this invention, there is provided the method for determining a combination of data to be transferred at the time of transferring data from N input lines to N output lines by using transfer request candidate data that shows candidates of data transfer requests in the N input lines with respect to the N output lines. The method comprises a first step of counting for each row the number of candidates in the data transfer request candidate data as the number of candidates at lattice points of a lattice composed of N rows×N columns, and a second step of searching for a minimum value out of count values that are equal to or greater than 1 as a result of the counting, and selecting and storing one row that shows the minimum value. The method also comprises, regarding the candidates in the selected row, a third step of counting the number of candidates in each column in which the candidates exist, a fourth step of searching for a minimum value out of count values that are equal to or greater than 1 as a result of the counting in the third step, and selecting and storing one column that shows the minimum value, and a fifth step of deleting all candidates on the row and candidates on the column determined in the second step and the fourth step. The first to fifth steps are repeated until no more candidates exist, and combinations of rows and columns stored at a point of time when no more candidates exist are determined as combinations of data for transfer used when the data transfer is executed.

According to still another aspect of this invention, there is provided the combination determining circuit that determines a combination of data to be transferred at the time of transferring data from N input lines to N output lines by using transfer request candidate data that shows candidates of data transfer requests in the N input lines with respect to the N output lines. The combination determining circuit comprises an AND circuit that obtains logical products of the data transfer request candidate data of N×N bits and permutation combination data of N×N bits that expresses all permutation combination patterns from 1 to N respectively, and a number calculating unit that calculates the number of candidates that take logical products, for each of the plurality of permutation combination patterns. The combination determining circuit also comprises a search determining circuit that compares a plurality of outputs of the number calculating unit, thereby to search for permutation combination patterns in which the number of candidates becomes a maximum, and determines one of these patterns as a combination of data to be transferred when the data to be transferred.

According to still another aspect of this invention, there is provided the combination determining circuit that determines a combination of data to be transferred at the time of transferring data from N input lines to N output lines by using transfer request candidate data that shows candidates of data transfer requests in the N input lines with respect to the N output lines. The combination determining circuit comprises a selected row and column candidate deleting unit that deletes candidates in the row and the column that are the same as the row and the column specified in a result of the last determination of combinations, from the data transfer request candidate data of N×N bits, and a row candidate number calculating unit that counts for each row the number of candidates in the output data of the selected row and column candidate deleting unit as the number of candidates at lattice points of N rows×N columns. The combination determining circuit also comprises a row minimum value comparator that searches for a minimum value equal to or greater than 1 out of a result of the counting in the row candidate number calculating unit, and selects one row that shows the minimum value, and a selected row and non-selected column candidate deleting unit that deletes candidates in columns in which the selected row has no candidates, from the output data of the selected row and column candidate deleting unit based on the row selected by the row minimum value comparator. The combination determining circuit further comprises a column candidate number calculating unit that counts for each column the number of candidates in each column, based on output data of the selected row and non-selected column candidate deleting unit, a column minimum value comparator that searches for a minimum value equal to or greater than 1 out of a result of the counting of the column candidate number calculating unit, and selects one row that shows the minimum value, and a selection result storing register that stores selection results in the row minimum value comparator and the column minimum value comparator respectively, and inputs the results to the selected row and column candidate deleting unit as a result of the last determination of a combination. When each selection result of the row minimum value comparator and the column minimum value comparator has been input to the selection result storing register by maximum N sets, data stored in the selection result storing register is output as a result of a final combination of data to be transferred.

According to still another aspect of this invention, there is provided the combination determining circuit that determines a combination of data to be transferred at the time of transferring data from N input lines to N output lines, by preparing transfer request candidate data, indicating candidates of data transfer request in the N input lines with respect to the N output lines, by a plurality of sets of the transfer request candidate data, corresponding to a plurality of priority classes relating to a processing order, and that is applied to data transfer in which a plurality of priority classes are handled, the plurality of priority classes in which one candidate can be selected from the same row and from the same column of all the sets of the transfer request candidate data. The combination determining circuit comprises a selected row and column candidate deleting unit that deletes candidates in input lines and output lines that are the same as the input lines and the output lines specified by a result of the last determination of combinations in all priority classes including the priority class specified by the result of the last combination determination and all lower priority classes than this priority class, from the data transfer request candidate data of a plurality of priority classes. The combination determining circuit also comprises a class selecting unit that repeatedly executes operation of selecting data transfer request candidate data for at least one priority class from the output of the selected row and column candidate deleting unit, and of outputting the selected data transfer request candidate data together with class data indicating a selected priority class, in order from a higher priority class to a lower priority class, each time when a combination of data to be transferred in each priority class is determined. The combination determining circuit further comprises a row candidate number calculating unit that counts for each row the number of candidates in the data transfer request candidate data in one priority class output from the class selecting unit, as the number of candidates at lattice points of a lattice composed of N rows×N columns, and a row minimum value comparator that searches for a minimum value equal to or greater than 1 out of a result of the counting in the row candidate number calculating unit, and selects one row that shows the minimum value. The combination determining circuit further comprises a selected row and non-selected column candidate deleting unit that deletes candidates in columns in which the selected row has no candidates, from the data transfer request candidate data of one priority class output from the class selecting unit, based on the row selected by the row minimum value comparator. The combination determining circuit further comprises a column candidate number calculating unit that counts for each column the number of candidates in each column, based on the output data of the selected row and non-selected column candidate deleting unit, a column minimum value comparator that searches for a minimum value equal to or greater than 1 out of a result of the counting in the column candidate number calculating unit, and selects one row that shows the minimum value, and a selection result storing register that stores selection results of the row minimum value comparator and the column minimum value comparator respectively together with the class selection data from the class selecting unit, and inputs the output to the selected row and column candidate deleting unit as a result of the last combination determination. Final data stored in the selection result storing register is output as a result of the data transfer combination.

Other objects and features of this invention will become apparent from the following description with reference to the accompanying drawings.

BRIEF DESCRIPTION OF THE DRAWINGS

FIG. 1A to FIG. 1E are diagrams which explain the process of a first embodiment of this invention, FIG. 3A to FIG. 3J are process diagrams which explain a combination determination algorithm of a second embodiment of this invention, FIG. 7 is a diagram which explains a conversion expression of the RR value that is applied to the lower n bits of the combination determining circuit shown in FIG. 6, FIG. 8 is a diagram which explains a data number restoration expression for returning a comparison result of the comparator of the combination determining circuit shown in FIG. 6 to data before the conversion, FIG. 12 is a diagram which shows an input ratio of nonuniform traffic from each input port to each output port, FIG. 13 is a diagram which shows an evaluation result of a computer simulation that applies the method of the present invention to an 8×8 communication switching apparatus, FIG. 14A to FIG. 14H are process diagrams which explain the switching combination determination process according to the conventional SRR system.

DETAILED DESCRIPTION

Figure 2:
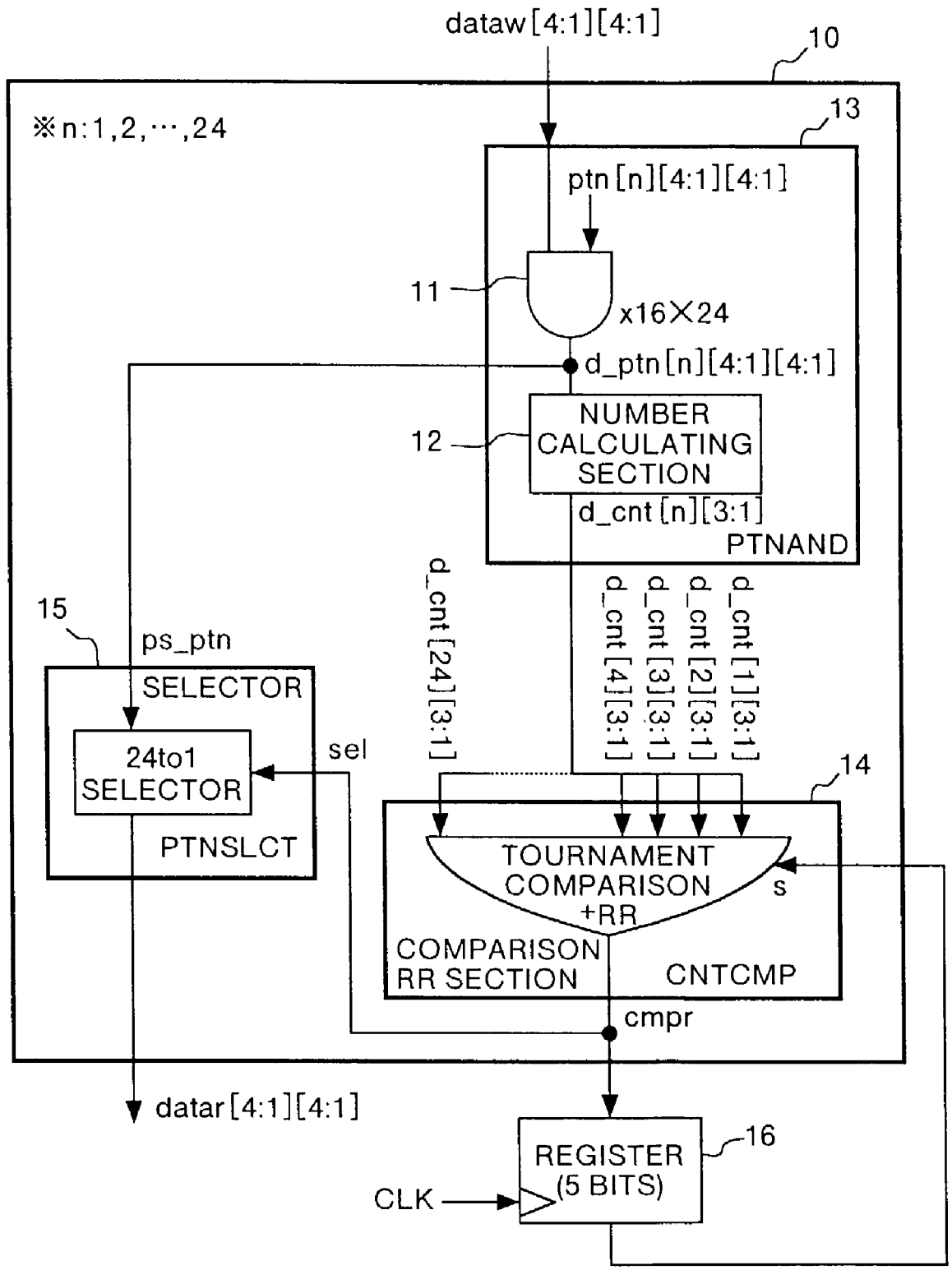
FIG. 2 is a block diagram which shows the combination determining circuit relating to the first embodiment of this invention.

Embodiments of the method for determining a combination of data to be transferred and the combination determining circuit according to this invention will be explained in detail below with reference to the attached drawings.

A first embodiment of this invention will be explained below. FIG. 1A to FIG. 1E show the concept of a combination determination algorithm according to the first embodiment of this invention. As shown in FIG. 1A, an N×N data switching apparatus is replaced with an N×N lattice point model. For example, N rows are corresponded to input lines of N channels, and N columns are corresponded to output lines of the N channels.

FIG. 1B shows a lattice point model of four rows and four columns. In this case, candidates of transfer-waiting data from input lines to output lines exist at lattice points indicated by the row 1 and the column 1, the row 1 and the column 2, the row 1 and the column 3, the row 2 and the column 1, the row 2 and the column 3, the row 3 and the column 1, the row 3 and the column 4, the row 4 and the column 3, and the row 4 and the column 4, respectively.

In this first embodiment, such a lattice point model is used to solve the task of "selecting a maximum number of lattice points under the condition that when there are $N^2$ lattice points of N rows×N columns and an optional lattice point is selectable from these lattice points, it is possible to select only one candidate as a maximum in each row and in each column of the N rows×N columns", that is required for data switching. In order to solve the above-mentioned task, all patterns of permutation combinations to arrange numbers from 1 to N (the number of combinations=a factorial of N (N!)) are prepared in advance. Logical products of all these permutation combination patterns and the candidates arranged on the lattice points are obtained. Patterns of permutation combinations where the output becomes 1, i.e., the number of candidates each of which has taken logical product becomes a maximum, are searched for to select one of these patterns.

FIG. 1C shows patterns of permutation combinations of four rows and four columns to arrange numbers from 1 to 4. The number of patterns of combinations in this case becomes a factorial of 4 (4!)=24.

FIG. 1D shows logical products of the candidate patterns arranged on the lattice points shown in FIG. 1B and all patterns of permutation combinations shown in FIG. 1C.

As shown in FIG. 1E, patterns of permutation combinations in which the number of the candidates that take logical products becomes a maximum are searched for to select one of the patterns. In the example shown in FIG. 1A to FIG. 1E, two sets have a maximum number [4], and one of these sets is selected.

In the system of this first embodiment, the number of patterns of permutation combinations that take logical products increases by the factorial of N. Therefore, apart from software, when it is necessary to realize the circuit with hardware in order to achieve high speed, it is anticipated that N up to about 6 is a realistic value. Basically, when N increases, only the circuit scale increases exponentially, and therefore the basic system does not change.

FIG. 2 shows an example of the hardware configuration of a 4×4 combination determining circuit. The combination determining circuit shown in FIG. 2 can be constructed entirely with only a combinational circuit. After a predetermined time since information indicating presence or absence of transfer-waiting data in all input and output lines has been prepared as input data, a combination of input and output lines that have been selected and determined is output.

A combination determining circuit 10 shown in FIG. 2 comprises an ANDed number calculating section (PT-NAND) 13 having (16×the number of patterns of permutation combinations) AND circuits 11 and a number calculating section 12, a comparison RR section (CNTCMP) 14 that carries out comparison and RR operation, and a selector (PTNSLCT) 15 (or a comparator in claim 20) that selects one out of 24 patterns. The combination determining circuit 10 also has a five-bit register 16 as an external circuit for RR.

The input and output interfaces are as follows.

Input signal lines (16 bits)

dataw[4:1] [4:1]; transfer request candidate data that shows candidates of data transfer requests in the N input lines with respect to the N output lines. Higher [4:1] show input lines and lower [4:1] show output lines, and [4:1] [4:1] shows a matrix of 4×4. In each 16 bits, 1: data present, and 0: data not present.

Output signal lines (16 bits, a result of selecting a combination)

explained above, ptn[n] [4:1] [4:1] are permutation combination data of N×N bits having a number of patterns of a factorial number of N that express all permutation combination patterns from 1 to N.

Each 16-bit AND circuit 11 executes the following logical product calculation for each signal line, and inputs the output d_ptn[n] [4:1] [4:1] to the number calculating section 12.

d_ptn[n] [4:1] [4:1]=dataw[4:1] [4:1] & ptn[n] [4:1] [4:1]

As the 24 permutation combination patterns ptn[n] [4:1] [4:1] are input simultaneously to the AND circuit 11, 24 sets of d_ptn[n] [4:1] [4:1] are obtained.

The number calculating section 12 executes the processing of calculating the number of candidates in the row direction that take the logical products, or the logical product output becomes 1, (or the number of candidates in the row direction) for each of the 24 sets of d_ptn[n] [4:1] [4:1], according to the following expressions.

d_cnt [n] [3:1] =
d_ptn [n] [1] [1] | d_ptn [n] [1] [2] | d_ptn [n] [1] [3] | d_ptn [n] [1] [4] +
d_ptn [n] [2] [1] | d_ptn [n] [2] [2] | d_ptn [n] [2] [3] | d_ptn [n] [2] [4] +
d_ptn [n] [3] [1] | d_ptn [n] [3] [2] | d_ptn [n] [3] [3] | d_ptn [n] [3] [4] +
d_ptn [n] [4] [1] | d_ptn [n] [4] [2] | d_ptn [n] [4] [3] | d_ptn [n] [4] [4]

where "|" is a symbol that expresses a logical sum. As d_cnt [n] [3:1] can take values from 0 to 4, d_cnt has a three-bit width.

datar[4:1] [4:1]; higher [4:1] show input lines and lower [4:1] show output lines, and [4:1] [4:1] shows a matrix of 4×4. In each 16 bits, 1: selection, and 0: no selection.

For example, when the input and output pattern shown in FIG. 1B is expressed in the column unit (looked at vertically), it is as follows.

dataw[4:1] [4:1]=1110. 1000. 1101. 0011b

The suffix "b" means that this expression is in the binary notation.

Further, when the input and output pattern shown in FIG. 1B is expressed in the row unit (looked at horizontally) it is as follows.

dataw[4:1] [4:1]=1110. 1010. 1001. 0011b

In the ANDed number calculating section (PTNAND) 13, the 16-bit input lines dataw[4:1] [4:1] and 16-bit permutation combination patterns ptn[n] [4:1] [4:1] are input to 16 AND circuits respectively. The 16 AND circuits 11 are prepared by the number of permutation combination patterns (24 in this case).

Each permutation combination pattern ptn[n] [4:1] [4:1] expresses in 16 bits one 4×4 permutation combination pattern shown in FIG. 1C. The pattern ptn[n] [4:1] [4:1] has the following permutation combination patters of 24 fixed values, and these 24 permutation combination patters are input to the AND circuit 11 at the same time.

For example, these patterns are expressed as follows.

ptn[1] [4:1] [4:1]=0001. 0010. 0100. 1000b ptn[2] [4:1] [4:1]=0001. 0001. 1000. 0100b ptn[24] [4:1] [4:1]=1000. 0100. 0010. 0001b These show numerical expressions of permutation combination patterns when numbers from 1 to 4 are arranged. As The comparison RR section (CNTCMP) 14 compares the input 24 sets of d_cnt values in tournament, and outputs a number n of the d_cnt value that resultantly becomes a maximum, as a comparison result cmpr.

When a maximum value is obtained, a plurality of d_cnt values may become maximum values and also the same values in some cases. In this case, a comparison RR section 14 (or a search determining circuit in claim 18) uniquely determines one d_cnt value by applying the RR system.

According to the RR, when there are n's that take a largest d_cnt value, for example, the last determined n is stored as $n_p$. Among the n's that take the largest d_cnt value, the value having the highest priority is set as $n_p$ +1, the value having the next highest priority is set as $n_p$+2, . . . , N, 1, 2, . . . , and the value having the lowest priority is set as $n_p$. The n is determined according to this priority order.

The comparison RR section 14 must execute the processing of selecting a maximum value by comparing in tournament the input plurality of d_cnt values, and the RR processing to uniquely determine a final selection result when there are selection results. In this case, the comparison RR section 14 expands the comparison bit length, thereby to set higher bits in the comparison bits as the d_cnt value, and set lower bits as a comparison value to realize the RR system. The comparison RR section 14 collectively compares these bits at the same time, and produces a result. In this way, a high-speed processing is achieved without involving a plurality of cross steps.

In other words, in this case, as there are 24 items to be compared, the RR values need to show values from 1 to 24. Namely, five bits are necessary for the bit width of the RR. Therefore, the comparison value becomes eight bits that include higher three bits showing the number of determined combinations (1 to 4) as the actual comparison value, and lower five bits for the RR. When the last determination result is s (s: 1, 2, . . . , 24), the d_cnt having the next highest priority becomes the (s+1)-th order. As a maximum value is searched for in this case, the lower five bits of the (s+1)-th d_cnt becomes 24, and the lower five bits of the (s+2)-th d_cnt becomes 23. In conclusion, the lower five bits are set as follows.

Higher three bits: lower five bits d_cnt[1]: s d_cnt[2]: s−1 d_cnt[S]: 1 d_cnt[s+1]: 24 d_cnt[s+2]: 23 d_cnt[24]: s+1

Based on the above, it is possible to simultaneously execute the comparison of obtaining a maximum value of the number of determined combinations, and the RR process of uniquely obtaining a result. As a result, it is always possible to output a unique determination result while maintaining evenness. However, as the last determination result is utilized for the RR value in this case, it is necessary to prepare a circuit that latches the last determination result in the register 16, and feeds it back to the inside.

The number cmpr of the permutation combination pattern that has been finally obtained is input to a selector (PT-NSLCT) 15 as a selection signal sel. Branch outputs of the 16-bit output d_ptn[n] [4:1] [4:1] of the AND circuit 11 have been input to the selector 15 as signals ps_ptn. The selector 15 selects a signal ps_ptn corresponding to the number shown by the selection signal sel, and outputs the signal as an output signal datar[4:1] [4:1]. In this way, a result of the combination of input and output lines through which data can be transferred is output as datar[4:1] [4:1].

As explained above, in the first embodiment, candidates of transfer-waiting data from input lines to output lines are compared and confirmed in tournament with all patterns of permutation combinations of a factorial of N. Then, one of combinations in which a largest number of data can be transferred is selected. Based on the employment of this system, it becomes possible to increase the data transfer capacity of the switching apparatus to the maximum.

In the above-described first embodiment, the model of N×N lattice points having input channels and output channels in the same numbers has been explained. In the case of a model of N×M lattice points that have input and output channels in different numbers, this model can be considered as a part of a model of K×K lattice points when max (N, M)=K. Therefore, it is conceivable that the model of N×M lattice points is included in the model of N×N lattice points, and it is possible to apply the above combination determination algorithm straight to this model. This similarly applies to second to fourth embodiments described later.

A second embodiment of this invention will be explained next with reference to FIG. 3A to FIG. 3J to FIG. 8. In the first embodiment explained above, it is necessary to confirm all permutation combinations corresponding to the factorial of N in tournament. When the value of N slightly increases, the number of the permutation combinations largely increases. At present, the realistic number of N is up to about 6 (6!=720), and it is difficult to apply this number to a general switching apparatus (the number of lines: about 8 to 64). Actually, the number of lines accommodated in the switching apparatus corresponds to 2 squared in many cases, the realistic number will be N=4 in many cases.

The second embodiment employs a system in which attention is paid to the number of candidates of transfer-waiting data that are deleted each time after one determination process is over and a combination of input and output lines is determined in such a way that this number always becomes minimum. The second embodiment employs the following algorithm.

Step (1)

Count the number of candidates on lattice points of N rows×N columns, for each row and for each column.

Step (2)

Search for a minimum value out of values of the counted result equal to or greater than 1, and select one of rows or columns that show this value.

Step (3)

Search for a minimum value out of numbers of candidates in columns or rows in which the candidates exist, and select one column or one row that shows this value, for the candidates in the selected row or column.

Step (4)

Store a combination of a row and a column determined at the steps (2) and (3).

Step (5)

Delete all candidates on the row and the column determined, count again the number of candidates in rows and columns not yet determined respectively, and then repeat the processing at the step (2) until no more candidates exist.

Step (6)

Obtain combinations of rows and columns stored at the point of time when no more candidates exist, as a final result of the input and output line combinations.

Further, in the processing at the steps (2) and (3), count values in all rows and columns are not necessarily searched for when a minimum value is to be searched for. Instead, count values in rows are first searched for, and a row is determined. Next, a column showing a minimum count value is determined out of columns corresponding to the candidates in this row. Based on this process, a column or a row that shows a minimum value is selected efficiently and at high speed.

The algorithm of the second embodiment will be explained using FIG. 3A to FIG. 3J. In FIG. 3A to FIG. 3J, it is assumed that the combinations of transfer-waiting data from input lines to output lines are the same as those shown in FIG. 14A to FIG. 14H or FIG. 17A to FIG. 17H, and that the last determination value of the RR is the same as that shown in FIG. 14A to FIG. 14H. In this example, by executing the step (1), the number of candidates of transfer-waiting data from input lines to output lines is calculated for each row and each column. In this example, the numbers of candidates of transfer-waiting data in the input lines #1, # 2, # 3, and # 4 (the numbers of waiting candidates in the rows) are 3, 2, 2, and 2, respectively, and the numbers of candidates of transfer-waiting data in the output lines # 1, # 2, # 3, and # 4 (the numbers of waiting candidates in the columns) are 3, 1, 3,and 2, respectively.

RRa shown at the bottom of each of FIG. 3A to FIG. 3E shows the RR value for selecting one input line when there are input lines in which the same minimum values exist. Numerical values [4, 1, 2, 2] (RRb) entered in boxes at the input side show the RR values for selecting one output line when there are output lines in which the same minimum values exist.

Next, the processing at the step (2) is executed, and one minimum value is selected out of the numbers of the waiting candidates at the input line side (rows). When the numbers of candidates at the input line side are compared, the input lines # 2, # 3 and # 4, each having 2 as the number of candidates, are the input lines that have a minimum value as shown in FIG. 3B. In order to select one of them, the RR value RRa (=3) is utilized, and the input line # 4 is first selected. RRa is set as RRa=4 so that the input line # 4 has the lowest priority.

Next, the processing at the step (3) is executed, and the numbers of waiting candidates in the plurality of columns (output lines) specified by the selected row (the input line # 4) are compared, thereby to select one column (an output line) in which a minimum number of waiting candidates has been specified. In this case, destinations of the two transfer-waiting data in the input line # 4 are the output line # 3 and # 4, as shown in FIG. 3C. When the numbers of candidates in these lines are compared in a similar manner, the number of candidates in the output line # 3 is 3, and the number of candidates in the output line # 4 is 2. As the number of candidates in the output line # 4 is the minimum and is the only one, the combination of the input line #4 and the output line # 4 is determined according to the first determination process (FIG. 3D). As the output line # 4 has been selected in this case, the RR value RRb of the input line # 4 is set as RRb=4 so that the output line # 4 has the lowest priority.

Next, the processing at the steps (4) and (5) are executed, and all candidates connected to the input line # 4 and the output line # 4 other than the determined candidate are deleted. In this case, the candidates of the input line # 4—the output line # 3, and the input line # 3—the output line # 4 are deleted, as shown in FIG. 3D and FIG. 3E. As a result of this deletion, the numbers of waiting candidates at the input line side become 3 for # 1, 2 for # 2, 1 for # 3, and 0 for # 4, and the numbers of waiting candidates at the output line side become 3 for # 1, 1 for # 2, 2 for # 3, and 0 for # 4, as shown in FIG. 3E.

In the second determination process, the input line # 3 that has a smallest number of candidates is first selected, as the input line. The output line # 1 is the only output specified by the input line # 3. Therefore, in the second determination process, the combination of the input line # 3 and the output line # 1 is selected (FIG. 3F). RRa is set to 3 so that the input line # 3 has the lowest priority, and RRb of the input line # 3 is set to 1 so that the output line # 1 has the lowest priority. Of the candidates connected to the input line # 3 and the output line # 1, those candidates other than the determined candidate are deleted, that is, the combinations of the input line # 1—the output line # 1, and the input line # 2—the output line # 1 are deleted. As a result of this deletion, the numbers of candidates at the input line side become 2 for # 1, 1 for # 2, 0 for #3, and 0 for # 4, and the numbers of candidates at the output line side become 0 for # 1, 1 for # 2, 2 for # 3, and 0 for # 4, as shown in FIG. 3G.

In the third determination process, the input line # 2 that has a smallest number of candidates is first selected, as the input line. The output line # 3 is the only output line specified by the input line # 2. Therefore, in the third determination process, the combination of the input line # 2 and the output line # 3 is selected (FIG. 3H). RRa is set to 2 so that the input line # 2 has the lowest priority, and RRb of the input line # 2 is set to 3 so that the output line # 3 has the lowest priority. Of the candidates connected to the input line # 2 and the output line # 3, the candidate other than the determined candidate is deleted, that is, the combination of the input line # 1 —the output line #3 is deleted. As a result of this deletion, the numbers of candidates at the input line side become 1 for # 1, 0 for # 2, 0 for # 3, and 0 for # 4, and the numbers of candidates at the output line side become 0 for # 1, 1 for # 2, 0 for # 3, and 0 for # 4, as shown in FIG. 3I.

In the fourth determination process, the combination of the input line # 1 and the output line # 2 is selected, as shown in FIG. 3J. RRa is set to 1 so that the input line # 1 has the lowest priority, and RRb of the input line #1 is set to 2 so that the output line # 2 has the lowest priority.

The numbers of candidates deleted at the respective determination stages are confirmed as follows.

FIG. 3D→FIG. 3E: two
FIG. 3F→FIG. 3G: two
FIG. 3H→FIG. 3I: one

Figure 15A:
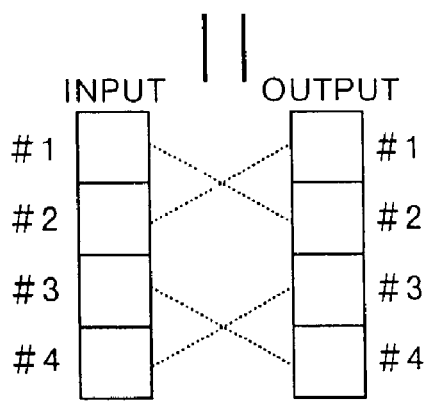
FIG. 15A and FIG. 15B are diagrams which show a result of a combination that realizes a data transfer of a maximum number of data and an input and output lines status in the combination of transfer-waiting data shown in FIG. 14A to FIG. 14H, FIG. 16A and FIG. 16B are diagrams which show an input and output line status that realizes a data transfer of a maximum number of data.

Therefore, it can be understood that the number of candidates deleted becomes the same as that shown in FIG. 17A to FIG. 17H in which four input and output lines have been determined by the RR system. As explained above, in this second embodiment, the number of candidates deleted is minimized to make it possible to determine as many combinations of input and output lines as possible. Actually, according to the method according to the second embodiment, in the case of 4×4, four combinations of input and output lines are determined without fail, for all combinations of the RR values. In other words, it is possible to reach any one of the selection results shown in FIG. 15A and FIG. 15B. It is possible to obtain such results by trial for all patterns with the computer.

Figure 15B:
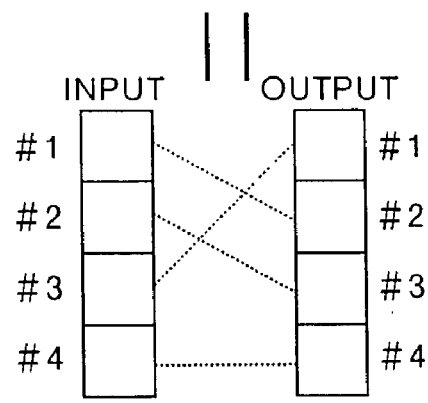
Figure 16A:
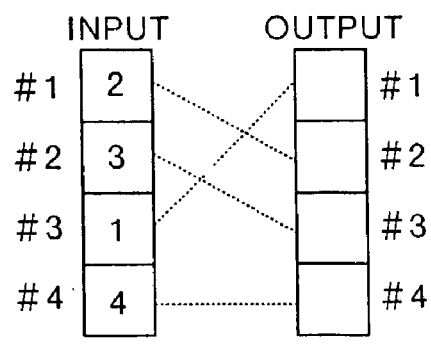
Figure 16B:
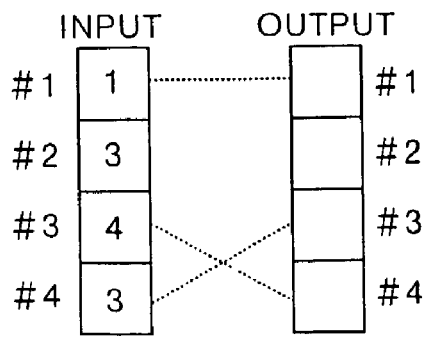
Figure 17A:
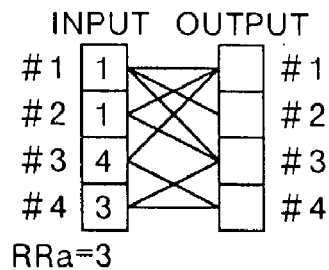
FIG. 17A to FIG. 17H are process diagrams which show the execution of the switching combination determination process based on other RR values according to the conventional SRR system.
Figure 17B:
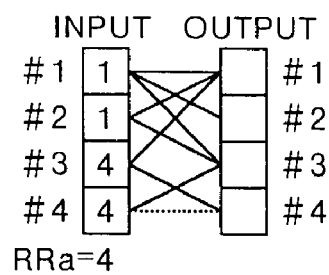
Figure 17C:
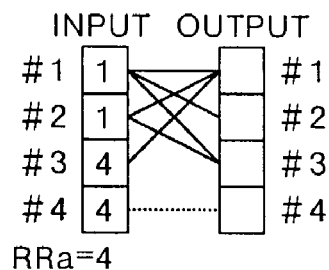
Figure 17D:
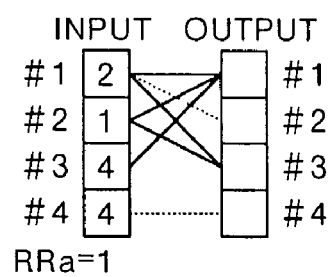
Figure 17E:
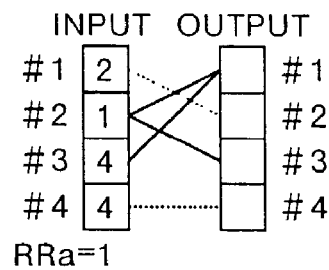
Figure 17F:
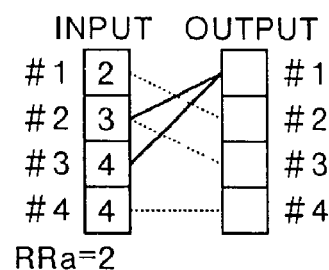
Figure 17G:
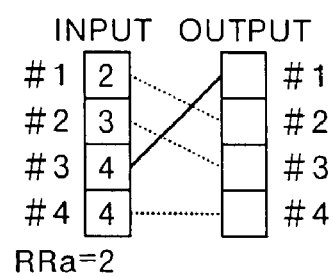
Figure 17H:
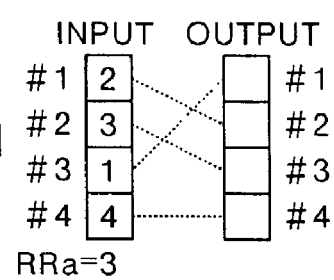

The result shown in FIG. 3A to FIG. 3J corresponds to the result shown in FIG. 15B. When the above method according to the second embodiment is executed to the transfer-waiting data starting from the status of the RR value shown in FIG. 3J, it is possible to obtain the result shown in FIG. 15A, as shown in FIG. 4A to FIG. 4H.

Figure 4A:
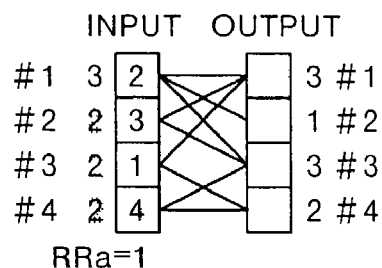
FIG. 4A to FIG. 4H are process diagrams which explain the combination determination algorithm of the second embodiment of this invention.

The operation will be explained briefly using FIG. 4A to FIG. 4H. First, one minimum value is selected out of the numbers of the waiting candidates at the input line side (rows). The input lines # 2, # 3 and # 4, each having 2 as the number of candidates, have a minimum value. As there is the RR value RRa (=1), the input line # 2 is first selected (FIG. 4A).

Figure 4B:
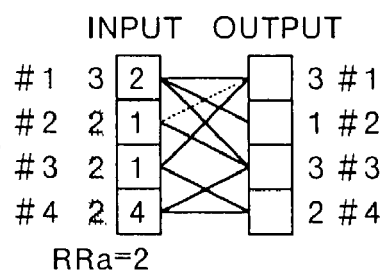

Next, the numbers of waiting candidates in the plurality of columns (output lines) specified by the selected row (the input line # 2) are compared, thereby to select one column (an output line) in which a minimum number of waiting candidates has been specified. In this case, destinations of the two transfer-waiting data in the input line # 2 are the output lines # 1 and # 3, as shown in FIG. 4B. Therefore, when the numbers of candidates in these lines are compared in a similar manner, the number of candidates in the output line # 1 is 3, and the number of candidates in the output line # 3 is 3, which are in the same number. The RR value RRb (=3) of the input line # 2 is referred to, and it is understood that the output line # 1 has a higher priority than the output line # 3. Therefore, the combination of the input line # 2 and the output line # 1 is determined according to the first determination process (FIG. 4B). As the input line # 2 has been selected, RRa is set as RRa=2so that the input line # 2 has the lowest priority. Further, as the output line # 1 has been selected, the RRb value RRb of the input line # 2 is set as RRb=1 so that the output line # 1 has the lowest priority.

Next, of the candidates connected to the input line # 2 and the output line # 1, those candidates other than the determined candidate are deleted. In this case, the combinations of the input line # 2—the output line # 3, the input line # 1—the output line # 1, and the input line # 3—the output line # 1 are deleted. As a result of this deletion, the numbers of candidates at the input line side become 2 for # 1, 0 for

Figure 4C:
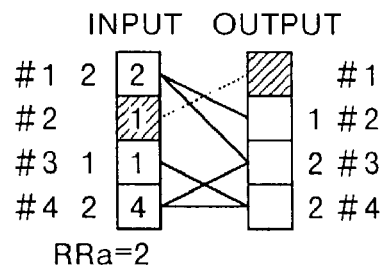

2, 1 for # 3, and 2 for # 4, and the numbers of candidates at the output line side become 0 for # 1, 1 for # 2, 2 for # 3, and 2 for # 4, as shown in FIG. 4C.

Figure 4D:
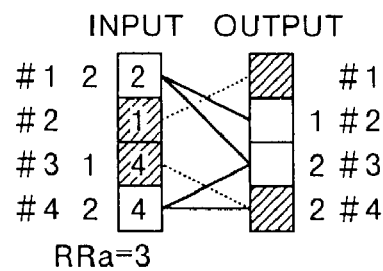
Figure 4E:
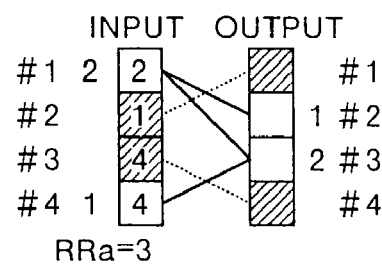

In the second determination process, the input line # 3 that has a smallest number of candidates is first selected, as the input line. The output line # 4 is the only output line specified by the input line # 3. Therefore, in the second determination process, the combination of the input line # 3 and the output line # 4 is selected (FIG. 4D). RRa is set to 3 so that the input line # 3 has the lowest priority, and RRb of the input line # 3 is set to 4 so that the output line # 4 has the lowest priority. Of the candidates connected to the input line # 3 and the output line # 4, those candidates other than the determined candidate are deleted, that is, the combination of the input line # 4 —the output line #4 is deleted. As a result of this deletion, the numbers of candidates at the input line side become 2 for # 1, 0 for # 2, 0 for # 3, and 1 for # 4, and the numbers of candidates at the output line side become 0 for # 1, 1 for # 2, 2 for # 3, and 0 for # 4, as shown in FIG. 4E.

Figure 4F:
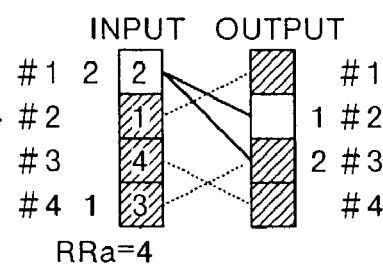
Figure 4G:
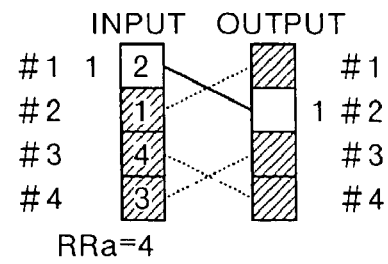

In the third determination process, the input line # 4 that has a smallest number of candidates is first selected, as the input line. The output line # 3 is the only output line specified by the input line # 4. Therefore, in the third determination process, the combination of the input line # 4 and the output line # 3 is selected (FIG. 4F). RRa is set to 4 so that the input line # 4 has the lowest priority, and RRb of the input line # 4 is set to 3 so that the output line # 3 has the lowest priority. Of the candidates connected to the input line # 4 and the output line # 3, those candidates other than the determined candidate are deleted, that is, the combination of the input line # 1—the output line # 3 is deleted. As a result of this deletion, the numbers of candidates at the input line side become 1 for # 1, 0 for # 2, 0 for # 3, and 0 for # 4, and the numbers of candidates at the output line side become 0 for # 1, 1 for # 2, 0 for # 3, and 0 for # 4, as shown in FIG. 4G.

Figure 4H:
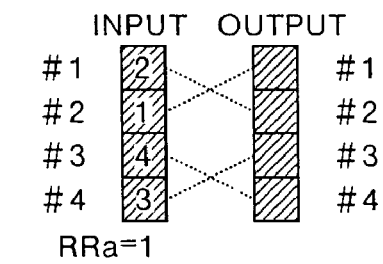

In the fourth determination process, the combination of the input line # 1 and the output line # 2 is selected as shown in FIG. 4H. RRa is set to 1 so that the input line # 1 has the lowest priority, and RRb of the input line #1 is set to 2 so that the output line # 2 has the lowest priority.

Figure 5:
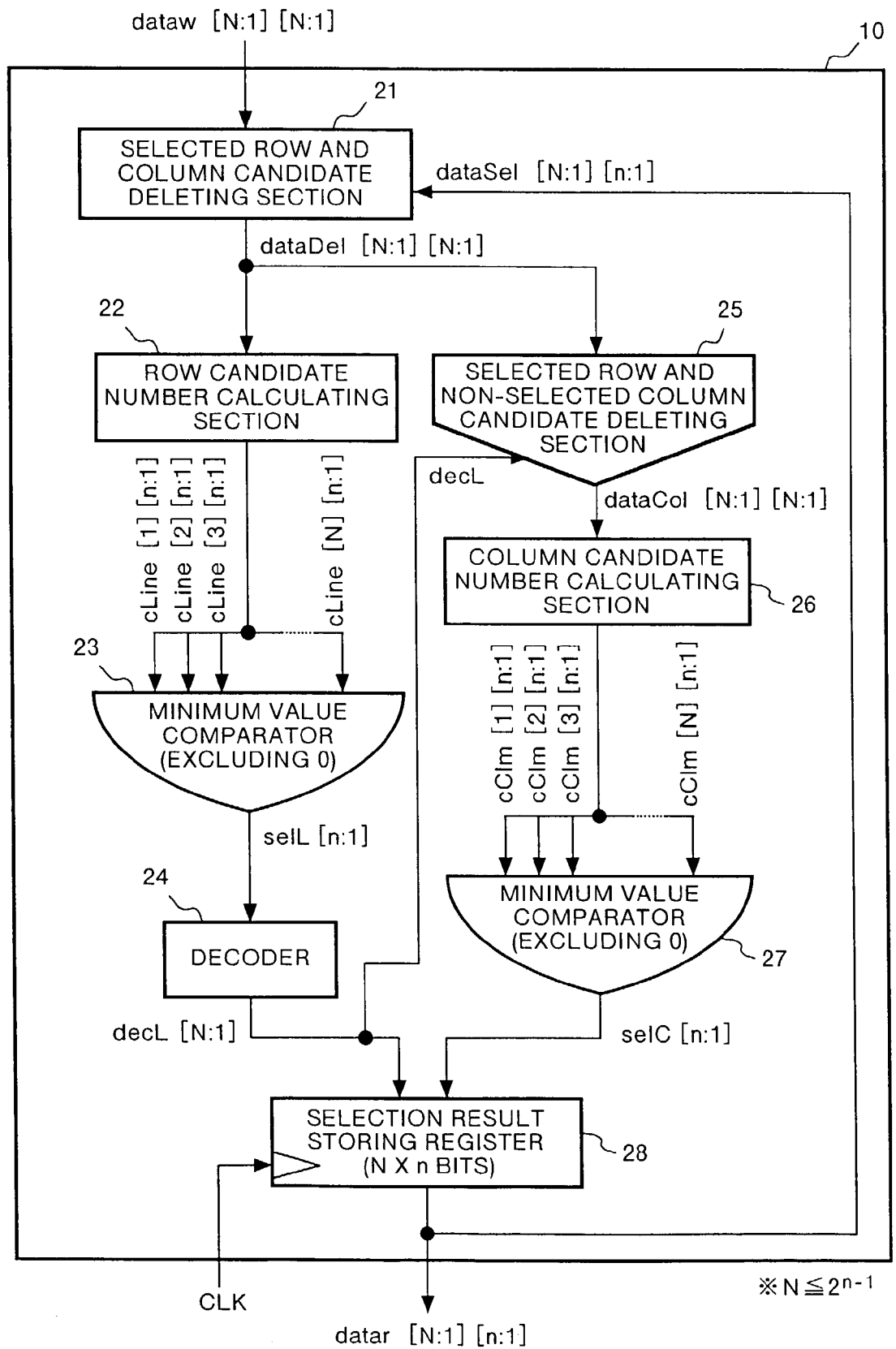
FIG. 5 is a block diagram which shows the combination determining circuit relating to the second embodiment of this invention.

FIG. 5 shows a circuit configuration that realizes the algorithm of the second embodiment. In the above explanation shown in FIG. 3A to FIG. 3J and FIG. 4A to FIG. 4H, when an input line (or output line) is to be selected and there exist input lines (or output lines) having the same number of candidates, one input line (or output line) is selected using the RR system. However, in the circuit shown in FIG. 5, when there exist input lines (or output lines) having the same number of candidates, any of the input lines or the output lines having a smaller input line number (or output line number) is preferentially selected.

A combination determining circuit 10 shown in FIG. 5 comprises a selected row and column candidate deleting section 21, a row candidate number calculating section 22, a row minimum value comparator 23, a decoder 24, a selected row and non-selected column candidate deleting section 25, a column candidate number calculating section 26, a column minimum value comparator 27, and a selection result storing register 28.

In FIG. 5, input and output interfaces are as follows.
Input signal lines (N×N bits)
dataw[N: 1] [N: 1];transfer request candidate data that shows candidates of data transfer requests in the N input lines with respect to the N output lines. Higher [N: 1] show input lines and lower [N: 1] show output lines, and [N: 1] [N: 1] shows a matrix of N×N. In each bit, 1: data present, and 0: data not present.

Output signal lines (N×n bits, a result of selecting a combination)
datar[N: 1] [n: 1]; higher[N: 1] show input lines and lower [n: 1] show output lines, and [N: 1] [n: 1] shows a matrix of N×n.

Clock
CLK; N clocks are necessary as a maximum for one-time determination.

Input signals include dataw that shows presence or absence of data, and clock CLK. The data format of the input dataw is the same as that in the first embodiment. The data format of the output datar is not that bits are set in respective lattice points like the first embodiment, but a column number is given to each row. This combination determining circuit 10 counts numerical values starting from 1 in all cases, and 0 is invalid. The output datar means the following. When the numerical value given to each row is a value from 1 to N, a selected candidate exists in the row, and this numerical value shows a column number. When the numerical value given to each row is 0, no candidate has been selected in this row.

Further, in FIG. 5, n denotes a number of bits that are necessary to express numerical values 1 to N. The contents of a numerical value are not expressed from 0 to N−1,but are basically from 1 to N. Based on this arrangement, the value of n that expresses the number of bits necessary to show a result as a numerical value becomes as shown in the remark at the right bottom in the figure. This is shown as $N \leq 2^{(n-1)}$, but it is general that $N=2^{n-1}$ in reality. When N=4, for example, n=3.

The selected row and column candidate deleting section 21 executes the processing of deleting all candidates of rows and columns that have been selected already. The selected row and column candidate deleting section 21 searches for a row and a column selected from the contents of dataSel that is output from the selection result storing register 28, and changes the values in corresponding row and column in the input dataw to 0. For example, when dataSel shows that the row 2 and the column 3 have been selected, all candidates in the row 2 and all candidates in the column 3 are changed to 0 in the lattice point model shown in FIG. 1B.

Numerical expressions of the processing of this selected row and column candidate deleting section 21 are given as follows.

dataDel=dataw, subject to the following changes;
if dataSel [i]>0 then dataDel [i]=0 (change values in the row to 0)
if dataSel [i]=j then dataDel [k] [j]=0 (change values in the column to 0)
(i, j, k=1, 2, . . . , N)

dataSel [i] expresses a numerical value of n bits (not N bits), and the numerical values 0 to N are valid. When the value is 0, this shows that nothing has been determined yet.

In the processing of the selected row and column candidate deleting section 21, a loop is necessary processing in the numerical expressions. For realizing the processing with a logical circuit, a combinational circuit composed of a decoder, a selector, and a circuit for a logical product to change a value into 0 is used. In the first determination process, the contents of dataSel are naturally all 0. Therefore, the contents of dataw are output straight to dataDel. The output dataDel of the selected row and column candidate deleting section 21 has been input to the row candidate number calculating section 22 and the selected row and non-selected column candidate deleting section 25.

The row candidate number calculating section 22 is a block that calculates the number of candidates in each row. A numerical expression of the processing executed in the row candidate number calculating section 22 is given as follows.

cLine [i]=dataDel [i] [1]+dataDel [i] [2]+ . . . +dataDel [i] [N]

(i=1, 2, . . . , N)

A result cLine of the calculation of candidates calculated for each row by the row candidate number calculating section 22 is input straight to the minimum value comparator 23.

The minimum value comparator 23 selects one of input N cLine [i] showing a minimum, and outputs this [i] value to sell. When cLine[i]=0, this value is not compared. When all cLine [i] is 0, sell outputs 0. Numerical expressions of this processing based on an image for circuit realization are given as follows.

if cLine [i]=0 then cLineS [i] [2n+1]=1
else cLineS [i] [2n+1]=0
cLineS [i] [2n:n+1]=cLine [i], cLineS [i] [n: 1]=i
(i=1, 2, 3, . . . , N)
cLineR=min (cLineS [1], cLineS [2], . . . , cLineS [N])
if cLineR [2n+1]=0 then sell=cLineR [n: 1]
else sell=0

In order to invalidate cLine that is 0, when cLine [i] is 0 at the beginning, 1 is erected in the highest bit of cLineS that is a bit string to actually carry out the comparison, and this is set as one of maximum values, without exception. A value (a row number) that shows an order of a row is inserted in the lowest bit n, so that even when there are the same values in cLine [i], each cLine [i] is finally uniquely determined based on the value of this lowest order. With this arrangement, when it is confirmed that 1 is set in the selected cLineS, that is, in the bit of the highest orderof cLineR, this means that there is no candidate and this cLineS is invalid. Therefore, 0 is output to sell. When the highest bit is 0, the lowest bit n of cLineR that corresponds to the row number is output to sell.

The bit string cLineS [i] to carry out the comparison has a bit width of 2n+1 bits, and has the following bit layout.

MSB when cLineS[i] [2n+1]=cLine [i]=0, 1, and when it is 1, 0 is obtained.

: cLineS [i] [2n:n+1]=cLine [i] [n: 1]
LSB cLineS [i] [n: 1]=i

In this case, the minimum value comparator 23 preferentially selects cLine [i] of a smaller row number, when there are a plurality of cLine [i] showing a minimum value. The n-bit output sell of the minimum value comparator 23 is input to the decoder 24, and is decoded to N bits there.

When sell is 0, all bits of an output decL of the decoder 24 become 0, and this shows that nothing has been selected. Numerical expressions of the processing of the decoder 24 are given as follows.

if sell=i then decL[i]=1
else *decL[i]*=0
(i=1, 2, 3, . . . , N)

The output decL of the decoder 24 is branched into two. One is input to the selected row and non-selected column candidate deleting section 25, and the other is input to the selection result storing register 28.

The selected row and non-selected column candidate deleting section 25 will now be explained. The selected row and non-selected column candidate deleting section 25 confirms presence or absence of candidates in the selected row by using the output decL of the decoder 24. When there exists a candidate in the selected row, all candidates in columns in which there exist no candidates are deleted. In other words, in the comparison processing to be executed later, when there exists a candidate in the selected row, the minimum value comparator 27 must execute the processing of selecting a column having a candidate of a minimum number from among columns in which candidates exist. However, there is a possibility that candidates exist in other non-selected rows, even when no candidates exist in columns of the selected row. Columns in which candidates exist in other non-selected rows must be excluded from columns to be compared by the minimum value comparator 27. Therefore, the selected row and non-selected column candidate deleting section 25 changes the candidates in the columns corresponding to the columns having no candidates in the selected row to 0. In the comparison processing of the minimum value comparator 27, 0 is disregarded. For example, in the lattice point model shown in FIG. 1B, when decL shows that the row 2 has been selected, all candidates in the column 2 and the column 4 having no candidates in the row 2 are deleted.

Numerical expressions of the operation in the selected row and non-selected column candidate deleting section 25 are given as follows.

dataCol=dataDel, subject to the following changes;
if dataDel [decL] [j]=0 then dataCol [i] [j]=0
(i, j=1, 2, 3, . . . , N)

The column candidate number calculating section 26 calculates the number of candidates in each column by using the output dataCol of the selected row and non-selected column candidate deleting section 25, and inputs a calculated candidate value cCLm in each column to the minimum value comparator 27. A numerical expression of the processing of the column candidate number calculating section 26 is given as follows.

cClm [j]=dataCol [1] [j]+dataCol [2] [j]+ . . . +dataCol [N] [j]

(j=1, 2, . . . , N)

The minimum value comparator 27 selects cClm having a minimum value out of cClm whose value is not 0, and outputs a column number to the selC. In this case, the minimum value comparator 27 uses the same circuit structure as that of the minimum value comparator 23. Numerical expressions of the processing contents are given as follows.

if cClm [j]=0 then cClmS [j] [2n+1]=1
else cClmS [j] [2n+1]=0
cClmS [j] [2n:n+1]=cClm [j], cClmS [j] [n: 1]=j
(j=1, 2, 3, . . . , N)
cClmR=min (cClmS [1], cClmS [2], . . . , cClmS [N])
if cClmR [2n+1]=0 then selC=cClmR [n: 1]
else selC=0

Here, the minimum value comparator 27 preferentially selects cClm having a smaller column number, when there are a plurality of cClm showing a minimum value not 0, in a similar manner to that of the minimum value comparator 23. This selC is input to the selection result storing register 28.

The selection result storing register 28 has a plurality (N) of registers. A register selected by the output decL of the decoder 24 obtained previously stores the value of selC given as column information. An output of the selection result storing register 28 is input to the selected row and column candidate deleting section 21 as dataSel, and is also output as a determination result datar of input and output lines. Numerical expressions of this operation are given below. In this example, an enabled D-type flip-flop is used for the register.

reg [N: 1] [n: 1];
reg. CLK=CLK, reg [i] [m]. D=selC [m], datar=reg. Q, reg [i] [m]. EN=decL [i]
(i=1, 2, 3, ..., N), (m=1, 2, ..., n)

It is noted that reg. CLK represents a clock of the register, reg. D represents a data input of the register, reg. Q represents a stored data output of the register, and reg. EN represents a positive logic enable input of the register.

As explained above, the selection result storing register 28 receives the clock CLK each time after a lapse of sufficient time to stabilize the contents of each combinational circuit at the previous stage from the selection result storing register 28. Based on this, an optimum column is determined for each selected row and it is therefore possible to complete the combination determination process at the point of time when there is no candidate in dataDel as output of the selected row and column candidate deleting section 21 or when clocks have been input N times.

Figure 6:
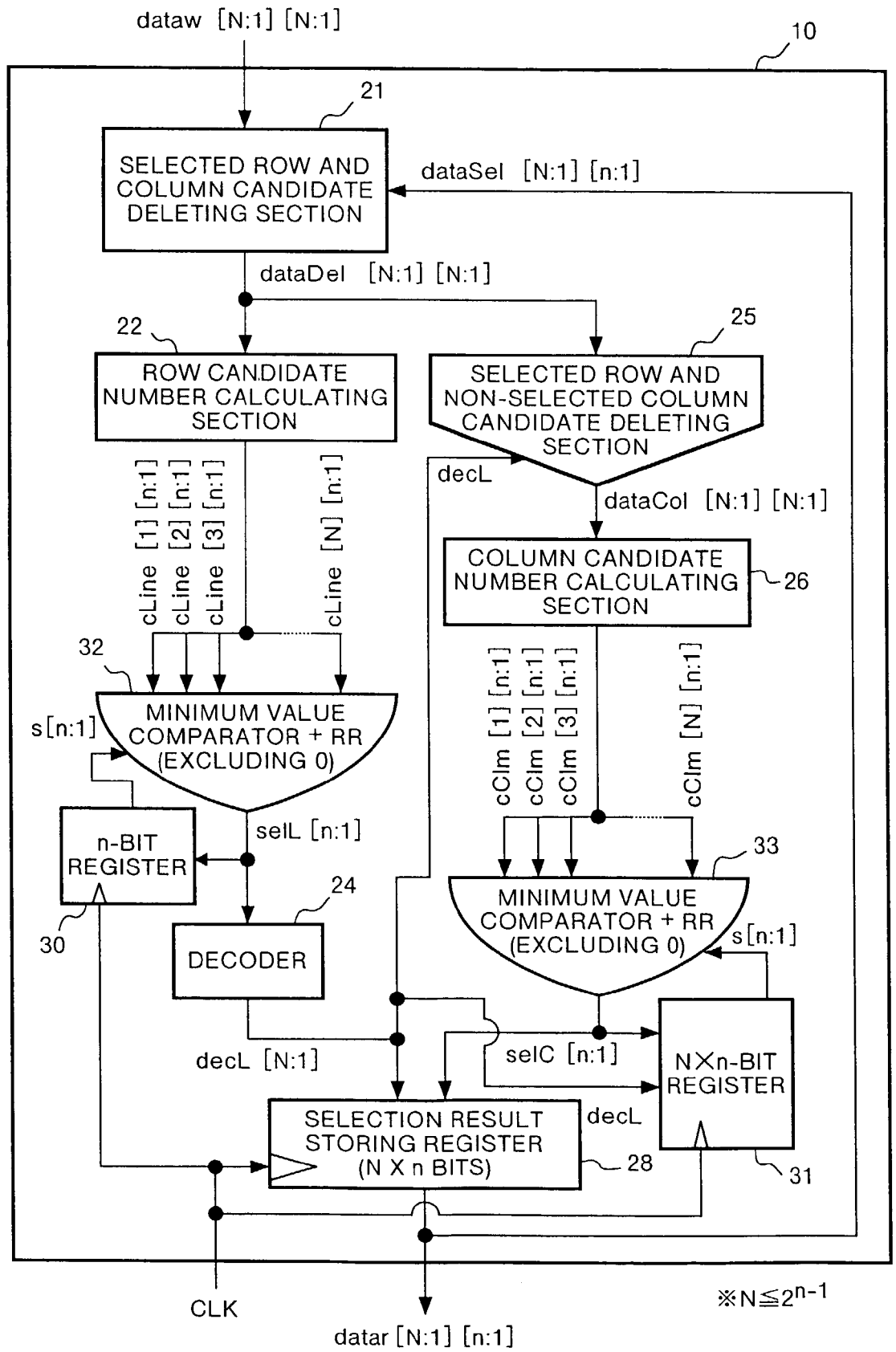
FIG. 6 is a block diagram which shows another combination determining circuit relating to the second embodiment of this invention.

FIG. 6 shows a circuit configuration for realizing the system shown in FIG. 3A to FIG. 3J or FIG. 4A to FIG. 4H. In other words, in selecting input and output lines, a combination determining circuit 10 shown in FIG. 6 selects one input line and one output line using the RR system, when input and output lines having the same number of candidates exist.

In the combination determining circuit 10 shown in FIG. 6, the selected row and column candidate deleting section 21, the row candidate number calculating section 22, the decoder 24, the selected row and non-selected column candidate deleting section 25, the column candidate number calculating section 26, and the selection result storing register 28 have the same functions as the functions of those shown in FIG. 5.

In the combination determining circuit 10 shown in FIG. 6, an n-bit register 30 and an N×n-bit register 31. At the same time, the RR function is added to the minimum value comparators 23 and 27 shown in FIG. 5 to that minimum value comparison RR circuits 32 and 33 can carry out the RR.

As is clear from the explanation of FIG. 3A to FIG. 3J or FIG. 4A to FIG. 4H, it is desirable that an RR value (RRb) for selecting a column is prepared for each row while one RR value (RRa) for selecting a row is prepared. Therefore, N RR values are prepared to select columns. For the RR value that is used to select a column, a register of the RR value to be used is selected from the N×n-bit register 31, by utilizing decL as a row selection result.

First, numerical expressions of the operation of the minimum value comparison RR circuit 32 that selects a row, and the operation of the n-bit register 30 that stores RR values are given as follows.

if cLine [i]=0 then cLineS [i] [2n+1]=1
else cLineS [i] [2n+1]=0
cLineS [i] [2n:n+1]=cline [i],
cLineS [i] [n: 1]=((N+i−s−1)% N)+1
(i=1, 2, 3, ..., N)
cLineR=min (cLineS [1], cLineS [2], ..., cLineS [N])
if cLineR [2n+1]=0 then sell=((cLineR [n: 1]+s−1) % N)+1
else sell=0

The n-bit register 30 uses an enabled D-type flip-flop.
reg [n: 1];
reg. CLK=CLK, reg [m]. D=sell [m], s=reg. Q, reg. EN=(sell>0)
(m=1, 2, ..., n)

The realization system of the minimum value comparison RR circuit 32 as a comparator is similar to that of the minimum value comparator 23 shown in FIG. 5, except only that ((N+i−s−1) % N)+1 is applied in the contents applied to the lower n bits of cLineS. Here, "%" is an operator that gives a remainder when the left-hand side numerical value is divided by the right-hand side numerical value. In the above numerical expression, N is added so that the value within the first bracket does not become negative. However, when an operating circuit with no sign for effective range of n bits is generated on the circuit, decimal placing is automatically carried out when a large numerical value is subtracted from a small numerical value. Therefore, addition of N is not necessary in this case.

When actually applying to ((N+i−s−1) % N)+1 starting from i=1, values as shown in FIG. 7 are obtained. According to the RR system applied in this case, the item corresponding to the last determination result has the lowest priority this time, and the next item has the highest priority. As a minimum value is searched for as the comparison result, the RR value of the item having the highest priority must have a smallest value (=1), and the item corresponding to the last determination result must have a largest value (=N). During this period, a sequential circulation is necessary. According to FIG. 7, it is understood that the above expression ((N+i−s−1) % N)+1 satisfies this requirement.

On the other hand, for the comparison result, the lower n bits of cLineS can be used as they are in the case of the minimum value comparator 23 shown in FIG. 5. However, in the case of the minimum value comparison RR circuit 32 shown in FIG. 6, as the converted value is used, it is necessary to return it to the original value.

The expression of ((cLineR [n: 1]+s−1) % N)+1 is used to achieve this. When calculation is actually carried out using this expression in a similar manner to the above, a result as shown in FIG. 8 is obtained. The values of ((cLineR [n: 1]+s−1) % N)+1 exactly coincide with i. It has been shown in the above that the RR system is implemented in the minimum comparison and thereafter the number of a selected row is obtained without fail.

Regarding the n-bit register 30 that stores RR values, basically the register is inserted into between sell and s. In this case, reg. EN=(sell>0) means that when sell is larger than 0, 1 is input, and when sell is equal to 0, 0 is input. With this arrangement, when the output result of the minimum value comparison RR circuit 32 is 0, that is, when the comparison result is invalid, the register is not changed.

The minimum value comparison RR circuit 33 that selects a column and the N×n-bit register 31 will now be explained.

The configuration of the minimum value comparison RR circuit 33 is exactly the same as that of the minimum value comparison RR circuit 32 that selects a row, and the explanation thereof will be omitted here. In the N×n-bit register 31 that externally stores RR values, a selector is provided so that it selects a register corresponding to the output decL of the decoder 24. An enabled D-type flip-flop is used for the N×n-bit register 31. Numerical expressions of this operation are given below.

reg [N: 1] [n: 1];
reg. CLK=CLK, reg [i] [m]. D=selC [m], reg [i] [m]. EN=decL [i],
if decL [i]=1 then s [m]=reg. Q [i] [m]
(i=1, 2, 3, ..., N), (m=1, 2, ..., n)

In other words, the contents of a register corresponding to the one having 1 for the bit in decL out of the N sets of n-bit registers are output to the register 31. The register of which contents are rewritten according to the clock CLK also is selected as a register having 1 for the corresponding bit in decL. Based on this, only the RR value for selecting a column corresponding to the row can be input to the minimum value comparison RR circuit 33, and the result can be stored in the same register at the next clock CLK.

As explained above, according to this second embodiment, attention is paid to the number of candidates of transfer-waiting data that are deleted each time after one determination process is over. The second embodiment employs the system in which a combination of input and output lines is determined in such a way that this number becomes always minimum. Therefore, it is possible to improve the data transfer capacity of the communication switching apparatus from the capacity of the conventional RR system.

A third embodiment of this invention will be explained using FIG. 9. In this embodiment, when a certain factor different from the above algorithm has occurred, a specific row priority signal fctL [n: 1] (=equal to or greater than 1: occurrence of a factor, 0: no factor), and a specific column priority signal fctC [n: 1] (=equal to or greater than 1: occurrence of a factor, 0: no factor) are input from the outside to a specified row preferentially selecting section 40 and a specified column preferentially selecting section 41 respectively. Minimum value comparators 23 and 27 temporarily replace row and column count values cLine and cClm specified by the specific row priority signal fctL [n: 1] and the specific column priority signal fctC [n: 1] with a minimum value that is selected with the highest priority, or 1, respectively. After the count values cLine and cClm of the specific row and column have been temporarily replaced with1in this way, the minimum value comparators 23 and 27 carry out a normal minimum value selection processing. With this arrangement, it is possible to increase the possibility of first selecting a specific row or column.

A numerical expression of the processing of the row candidate number calculating section 22 is given as follows.

cLine [i]=dataDel [i] [1]+dataDel [i] [2]+. . . +dataDel [i] [N]

(i=1, 2, . . . , N)

A numerical expression of the processing of the specified row preferentially selecting section 40 is given as follows.

if fctL>0 then if cLine [fctL]>0 then cLine [fctL]=1

A numerical expression of the processing of the column candidate number calculating section 26 is given as follows.

cClm [j]=dataCol [1] [j]+dataCol [2] [j]+. . . +dataCol [N] [j]

(j=1, 2, . . . , N)

A numerical expression of the processing of the specified column preferentially selecting section 41 is given as follows.

if fctc>0 then if cClm [fctC]=1 then cClm [fctC]=1

The above expressions have an additional process of setting a count value 1 to the row or column being a target due to occurrence of a factor. However, when there is no candidate in the row or column, the replacing to 1 is not executed.

Figure 9:
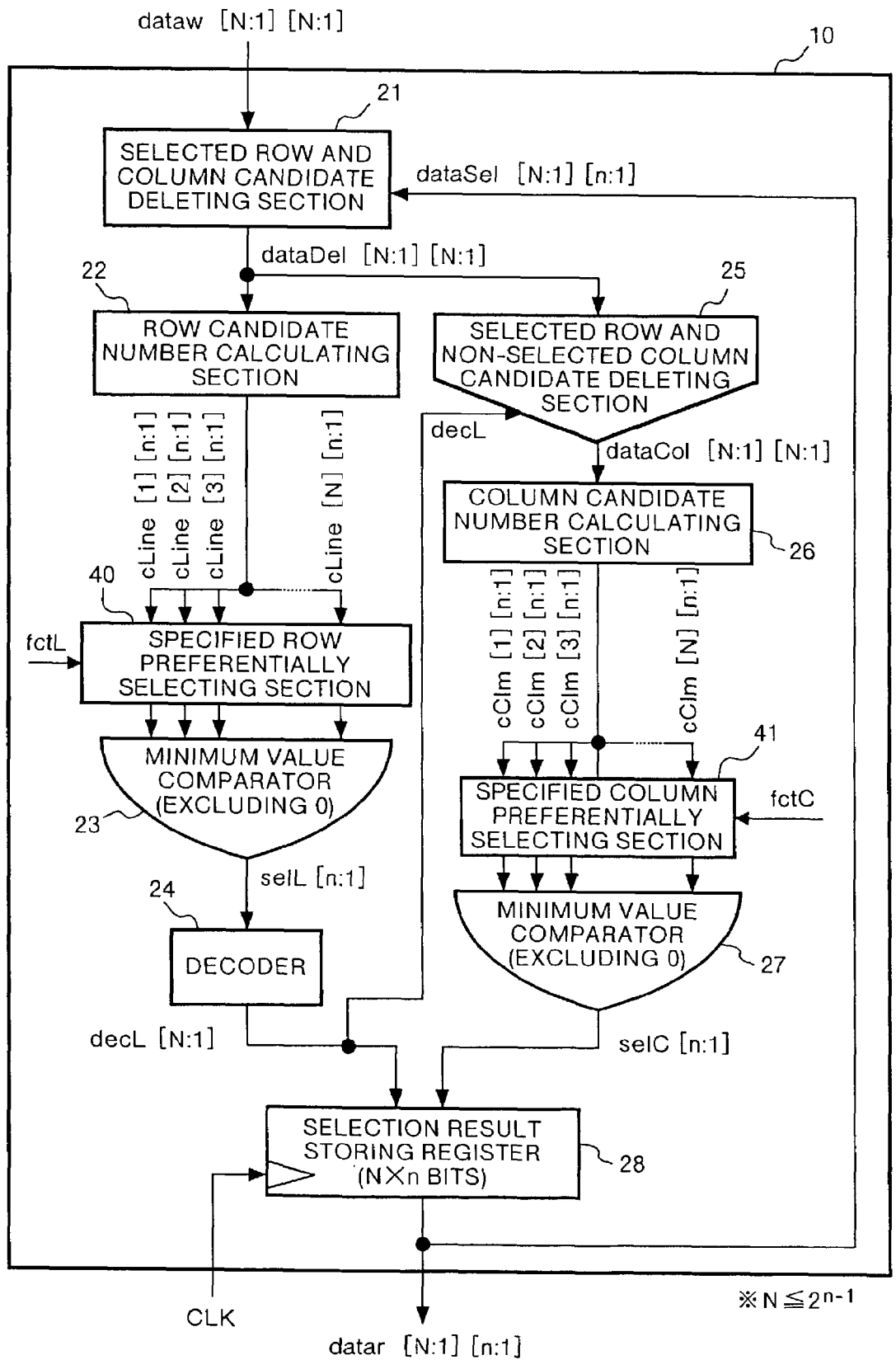
FIG. 9 is a block diagram which shows a combination determining circuit relating to a third embodiment of this invention.

In the case of FIG. 9, a circuit that specifies a different value to each row is not particularly shown for fctC. It is general to take a structure that fctc [N: 1] [n: 1] is used to give a different value to each row, and a value different for each row is selected by utilizing the value of decL that is output from the decoder 24. It is not necessary that fctL and fctC are applied to the row and the column at the same time, and it is possible to select only a row or a column based on fctL or fctc. In FIG. 9, the specified row preferentially selecting section 40 and the specified column preferentially selecting section 41 are added to the combination determining circuit 10 shown in FIG. 5. Alternatively, the specified row preferentially selecting section 40 and the specified column preferentially selecting section 41 may be added to the combination determining circuit 10 that uses the RR system shown in FIG. 6.

Similarly, as an application example of fctL and fctC, it is a most realistic method to apply them to a minimum value comparator in order to forcibly select a targeted row or a column. In other words, in the following method, when an external factor has occurred, count values in rows or columns other than the row or the column targeted by the external factor are replaced with 0, so that a specific row or column is forcibly selected. Numerical expressions of the processing carried out by the minimum value comparator are shown below.

selX=0, k=N+1;

If 0<cXxx [i] AND cXxx [i]<k then if fctX=i then k=1, selX=i else k=cXxx [i], selX=i (i=1, 2, 3, . . . , N)

The above expressions describe the processing after the count values in rows or columns other than the row or the column targeted by the external factor have been changed to 0 based on the data according to the external factor.

In the above, selX represents sell and selC, cXxx represents cLine and cClm, and fctX represents fctL and fctC. Based on these expressions, at the time of searching for a minimum value greater than 0, when cXxx that fctX shows is equal to or greater than 0, that is, when there is a candidate, selX is replaced with fctX. Thus, the condition for the change is set that selX is greater than 0 and smaller than 1, which never occur, and thereby selX is prevented from being changed.

For the comparator having the RR function, the processing is similar to the above, and the following expressions are obtained.

selX=0, k=N+1;

if 0<cXxx [i] AND cXxx [i]<k then if fctX=i then k=1, selX=i else k=cXxx [i], selX=i (i=s+1, s+2, . . . , N, 1, . . . , s)

The register that stores RR values has not been changed at all, and therefore, this will not be particularly shown. Further, for fctC, like in the above, it is general to take a structure that fctC [N: 1] [n: 1] is used to give a different value to each row, and a value different for each row is selected by utilizing the value of decL that is output from the decoder. It is not necessary that fctL and fctC are applied to the row and the column at the same time, and it is possible to select only a row or a column based on fctL or fctC.

A fourth embodiment of this invention will be explained using FIG. 10 and FIG. 11. This fourth embodiment shows a combination determination algorithm when there are priority classes for processing orders, that is, when there are N×N lattice models and a priority class has been set to each lattice model. When priority classes have been set to a plurality of lattice models, the condition for selecting input and output lines is that it is possible to select only one candidate in the same row and the same column in all lattice models. In other words, the condition is that only one candidate is selectable in an i-th (i=1 to N) row of all lattices and in a j-th (j=1 to N) column of all the lattices.

This fourth embodiment employs the following algorithm.

Step (1)

Check presence or absence of a candidate in classes starting from a higher priority class. In the highest priority class lattice in which a candidate exists, execute the lattice point selection process of the second embodiment.

Step (2)

For the row and the column on a determined lattice point, delete candidates in the same row and the same column of all lattices lower than the determined lattice.

Step (3)

Repeat the step (1) and the step (2) by N times at the maximum until there are no more candidates.

Figure 10:
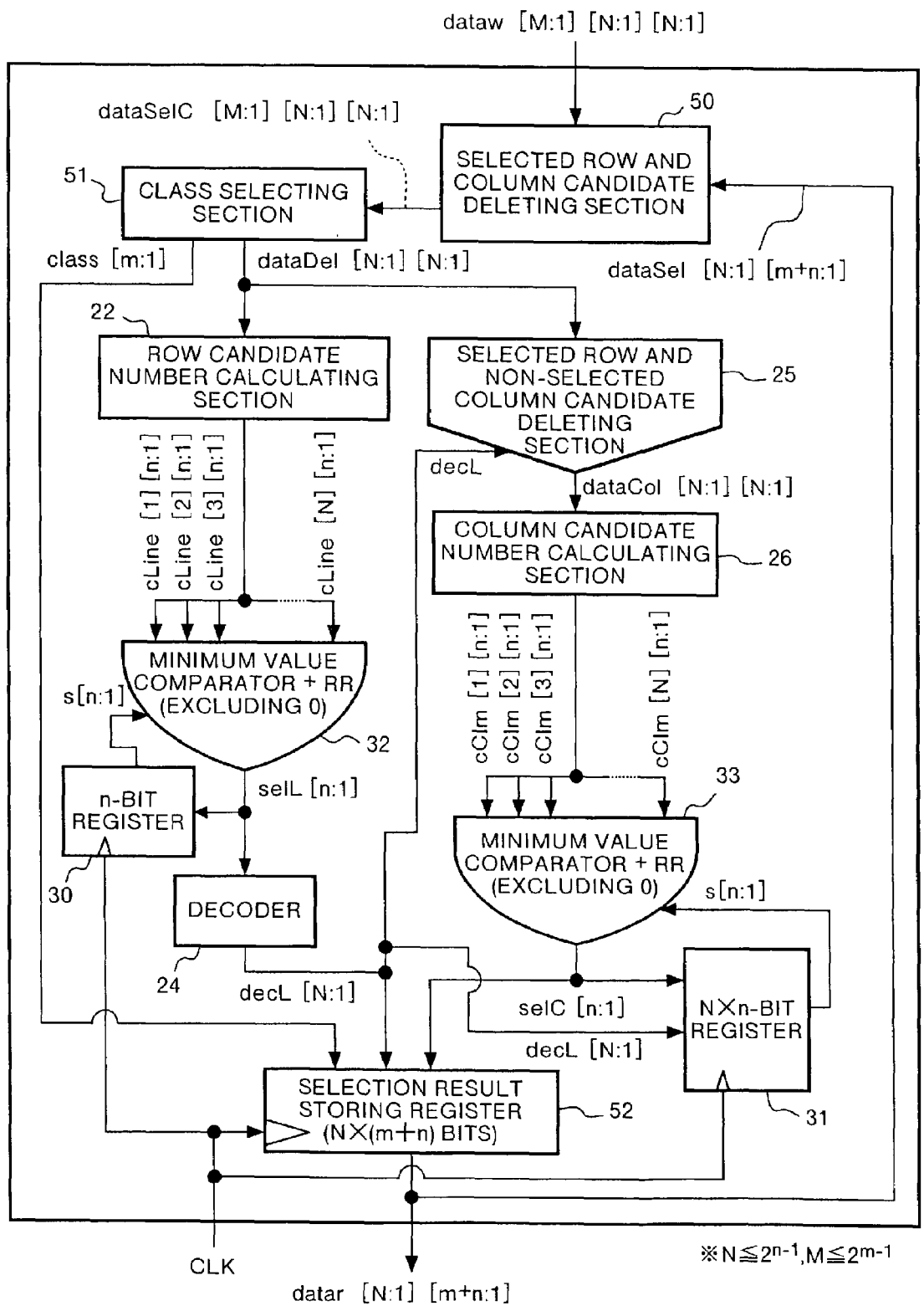
FIG. 10 is a block diagram which shows a combination determining circuit relating to a fourth embodiment of this invention.

FIG. 10 shows the configuration of a combinational circuit that realizes the above algorithm. In FIG. 10, input and output interfaces are as follows.

Input signal line (M×N×N bits)

dataw[M: 1] [N: 1] [N: 1]; higher [M: 1] shows the priority class, the intermediate [N: 1] shows the input line, and the lower [N: 1] shows the output line.

Output signal lines (N×(m+n) bits, a result of selecting a combination)

datar [N: 1] [m+n: 1]; higher [N: 1] shows the input line, and the lower [m+n: 1] shows the output line and the priority class.

Only constituent elements that have been added to or changed from the circuit configuration of the second embodiment shown in FIG. 6 will be explained below.

Numerical expressions of the processing of a selected row and column candidate deleting section 50 are given as follows.

dataSelC=dataw, subject to the following changes;

if dataSel [i]>0 then dataSelC [h] [i]=0 (change values in the row to 0)

if dataSel [i] [n: 1]=j then dataSelC [h] [k] [j]=0 (change values in the column to 0 )

(h=1, 2, . . . , M), (i, j, k=1, 2, . . . , N)

In the above, dataSel [i] [n: 1] means the lower n bits of dataSel [i]. According to the above expressions, candidates in all classes of the row and the column corresponding to the value of dataSel are targets to be deleted.

A class selecting section 51 selects a class to be executed in the determination process, and outputs the output data of the selected row and column candidate deleting section 50 in the selected class as dataDel, and also outputs a selected class number "class". Numerical expressions of this processing are given as follows.

class=0, subject to the execution of the following process;

if dataSelC [h] [i] [j]=1 then dataDel=dataSelC [h], class=h (h=1, 2, . . . , M), (i, j=1, 2, . . . , N)

In the above, h is counted sequentially starting from 1 corresponding to the highest priority class, and i and j are all confirmed for the value of each h. The operation is finished at the point of time when the condition has been satisfied. Confirmation is carried out always from the higher class. If there is even one candidate, the candidate data of this class is selected as an item to be processed, and is output to dataDel. At the same time, this class number is output to class. An actual circuit takes a logical sum of dataSelC for each class, applies a result of this for each class to a priority encoder (a priority selecting circuit), and selects a highest class out of classes in which the result of the logical sum is 1. The circuit then outputs a number corresponding to this class (0 when the result of the priority encoder is 0).

A selection result storing register 52 has an additional register so as to be able to store the information of m bits relating to the class. In other words, m bits are added to the selection result storing register 28 shown in FIG. 6 in order to store the class number in each higher class of datar[i].

Figure 11:
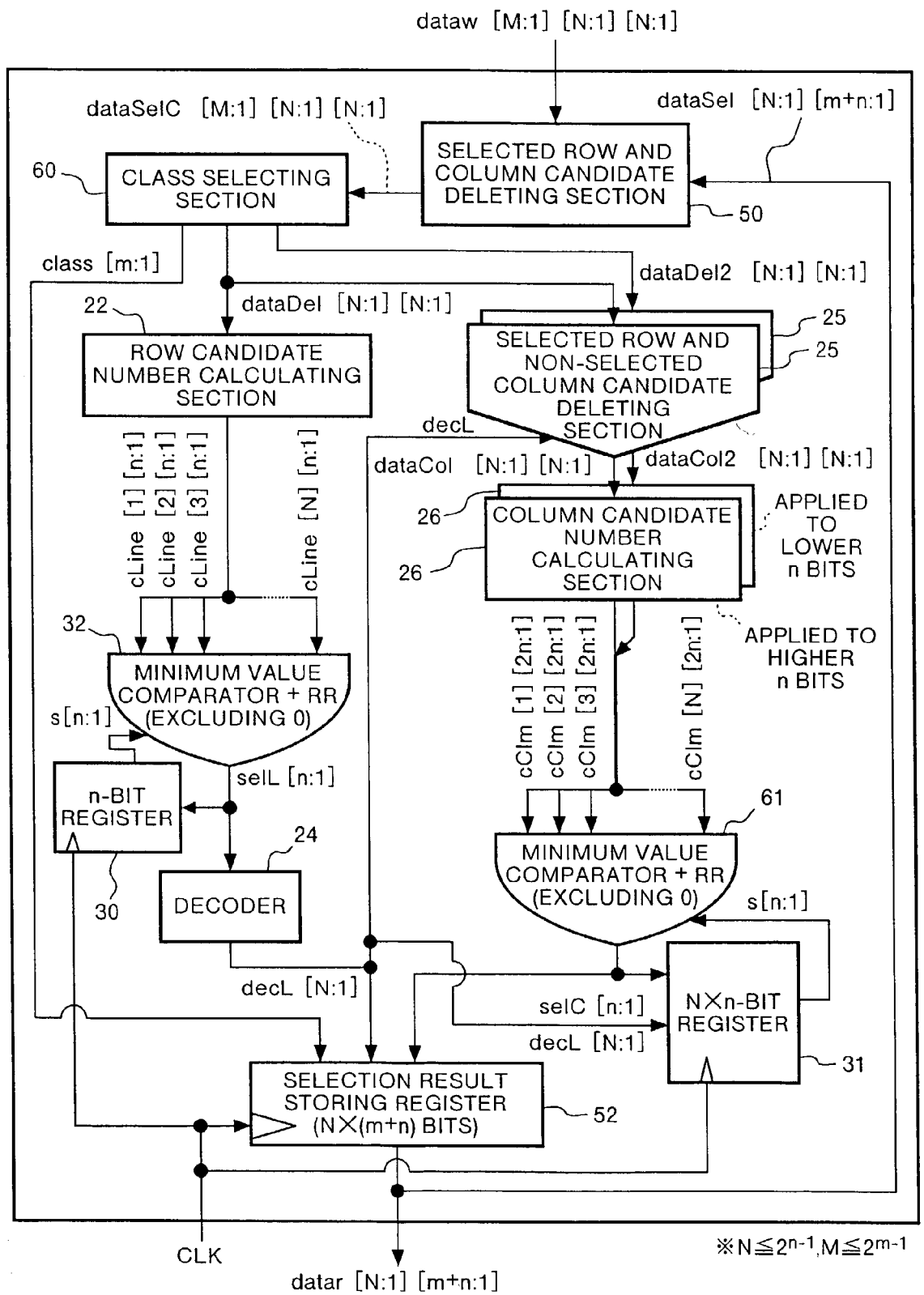
FIG. 11 is a block diagram which shows another combination determining circuit relating to the fourth embodiment of this invention.

FIG. 11 shows a modification of the combination determining circuit shown in FIG. 10. The combination determining circuit shown in FIG. 11 employs the following algorithm. In the combination determining algorithm that handles a plurality of priority classes, when numbers of candidates in the determination process of a certain priority class are compared to find that the numbers of candidates are the same in this class, the numbers of candidates in the priority class lower by one level or further lower classes are compared sequentially. In this way, a combination is determined by taking into account the status of candidates of lower priority classes. However, in the combination determining circuit shown in FIG. 11, lower classes are taken into account only when a column is determined. In this case, candidates in classes up to the one-level lower class are taken into account. When it is not possible to carry out a unique determination, the RR is utilized.

Only constituent elements that have been added to or changed from the circuit structure shown in FIG. 10 will be explained below.

In a class selecting section 60, the class selecting section 51 shown in FIG. 10 is added with a function of outputting candidate data dataDel 2 that is in the one-level lower class than the class to be executed in the determination process as well. When the lowest class has become a target to be executed in the process, 0 is output for all candidate data in the one-level lower class. Numerical expressions of this function are given as follows.

class=0, subject to the execution of the following process;

if dataSelC [h] [i] [j]=1 then dataDel=dataSelC [h], class=h if h=M then dataDel 2=0 else dataDel 2=dataSelC [h+1]

(h=1, 2, . . . , M), (i, j=1, 2, . . . , N)

In the above, h is counted sequentially starting from 1, and i and j are all confirmed for the value of each h. The operation is finished at the point of time when the condition has been satisfied.

The selected row and non-selected column candidate deleting section 25 has an additional circuit to process a one-level lower class. The operation is the same as that of the above-described selected row and non-selected column candidate deleting section 25.

The column candidate number calculating section 26 has an additional circuit to process a one-level lower class. The operation is the same as that of the above-described column candidate number calculating section 26.

The data dataDe12 that is output from the class selecting section 60 is processed by the selected row and non-selected column candidate deleting section 25 and the column candidate number calculating section 26 in a similar manner to that described above, and a result is added to the lower n bits of a result of the number of candidates as the target class. A result is input to a minimum value comparison RR circuit 61.

The minimum value comparison RR circuit 61 has an expansion of further n bits in the comparison bit width, in order to be able to compare the one-level lower class at the same time. In other words, the comparison bit width is 1 (presence or absence of the number of candidates in the target class)+n (the number of candidates in the target class)+n (the number of candidates in the one-level lower class)+n (the RRvalue), that is, 3n+1 bitwidth. Whether the number of candidates is 0 or not is confirmed in the class to be executed, and the numbers of candidates in lower classes are not relevant. Numerical expressions of the processing of the minimum value comparison RR circuit 61 are given as follows.

if cClm [i]=0 then cClmS [i] [3n+1]=1
else cClmS [i] [3n+1]=0
cClmS [j] [3n:n+1]=cClm [j], cClmS [j] [n: 1]=((N+j−s−1) % N )+1
(j=1, 2, 3, . . . , N)
cClmR=min (cClmS [1], cClmS [2], . . . , cClmS [N])
if cClmR [3n+1]=0 then selC=((cClmR [n: 1]+s−1) % N)+1
else selC=0

As explained above, according to the combination determining circuit shown in FIG. 11, bits to which the number of candidates in the lower class is applied are provided between the bit to which the number of candidates of the target class is applied and the bit to which the RR is applied, and the comparison is carried out. When it is not possible to uniquely determine a number as a result of comparing the numbers of candidates in the target class, the status of the one-level lower class is looked at, and the one having a smaller number of candidates to be deleted is selected. With this arrangement, to maintain the number of candidates to be deleted in one process as small as possible is realized as the basic principle of this algorithm. As a result, it is possible to increase the probability of selecting candidates as many as possible. In other words, when this algorithm is actually applied to the communication apparatus, it is possible to maintain the data transfer capacity of the apparatus at a high level.

Simulation Evaluation Result

FIG. 13 shows an evaluation result of a computer simulation that applies the above system to an 8×8 communication switching apparatus. The process applied for the RR system is that shown in FIG. 14A to FIG. 14H, and the algorithm in the present invention is the system shown in FIG. 3A to FIG. 3J. In both systems, eight virtual output queues are provided in each input port, in order to cancel a reduction in the throughput due to the Head of Line blocking. The switching is in the cell unit of a 256-byte fixed length. For the sake of simplicity, input traffics are all in a 256-byte fixed length. The speed of each input and output port is 10 Gb/s (10 giga bits per second). Each measurement result is obtained as an average of measuring five times by changing random number pages, and a 95% reliable sector is also shown. The input traffics are all based on a most general Marcov process that utilizes an index distribution. The band is assumed as 99% average of the port speed (9.9 Gb/s). The allocation of the band from each input port to an output port is evaluated for the following two types (uniform and nonuniform).

Uniform

One eighth of the band is allocated from each input to each output port. In other words, viewing from a certain input port, one eighth of traffic flows to each of all output ports. Viewing from a certain output port, one eighth of traffic is input from each of all input ports.

Nonuniform

As shown in FIG. 12, the traffic from each input port to each output port is not uniform. In FIG. 12, for example, the allocation of a band from the input port # 1 to output ports are in the ratio of 7: 4: 8: 1: 6: 5: 2: 3 in order from the output port number # 1. As the total of these values becomes 36, seven-36th of all traffic of the input port # 1 flows to the output port # 1. In FIG. 12, each total in the vertical direction and the lateral direction becomes 36. This means that each output port receives an average flow of the same traffic in total as the traffic of each input port, and that constant buffer overflow attributable to the band shortage does not occur in the output ports.

The evaluated data are in two types of an abandon rate and a switch determination rate.

Abandon Rate: This is a common logarithm of a ratio that shows how much traffic has been abandoned out of the input traffic by the input buffer. When the abandon rate is 1%, the value becomes −2 (=log 0.01).

Switch Determination Rate: This shows an average of how many candidates have been determined as a result of each combination determination process, based on a record. A maximum eight candidates are determined based on 8×8. Assuming that k candidates are determined each time and k data is transferred, k-eighth is recorded and this is averaged to obtain this rate. As the basic traffic is 99%, about 99% is a maximum value. An observation of a simulation result shown in FIG. 13 is shown below.

About the Abandon Rate

When the traffic is uniform, little difference is observed between a result according to the present invention and a result according to the RR system. Rather, the abandon rate is lower according to the RR system, but this difference is not remarkable. The RR system is basically optimum in exhibiting the evenness of each port. Therefore, this system can exhibit its capacity particularly in the uniform traffic. However, this result makes a large change when nonuniform traffic is input. According to the present invention, the abandon rate is −4.27, and this is better than that when the traffic is uniform (this is not substantially a large difference). According to the RR system, its characteristics are lowered extremely, and the abandon rate is −1.48. This shows the abandon rate of one per 30 packets, which shows very bad characteristics. This is because this system cannot flexibly cope with nonuniform traffic, only for the purpose of exhibiting evenness on the contrary. According to the present invention, the algorithm is designed in order to increase the switching capacity of the communication apparatus as a whole. Therefore, even when nonuniform traffic has been input, the system can flexibly cope with the situation, and can show slightly better characteristics than that when the traffic is uniform. As it is rare that uniform traffic flows in the real network, the present invention is superior.

About the Determination Rate

The fact that the abandon rate becomes about −4.0 for the traffic other than the nonuniform traffic of the RR system means that one is abandoned per 10000 packets. It is understood that, in comparison with the average value of the input traffic shown in FIG. 13, the abandon rate for the traffic other than the nonuniform traffic of the RR system has a difference of only about one-ten thousandth (about 0.01 per 99 in total). A difference is clear in the case of the nonuniform traffic of the RR system, and there is a difference of three-hundredths. Three-hundredths with respect to one-ten thousandth means a difference of 300 times. This difference between the characteristics becomes an essential element to bear the severe environment like that of the present simulation of 99%, as the abandon generally brings about a further traffic based on a retransfer.

As explained above, according to the method for determining a combination of data to be transferred, as one aspect of this invention, logical products of the data transfer request candidate data of the N×N bits and N! permutation combination data of the N×N bits that expresses all permutation combination patterns from 1 to N respectively are obtained. Permutation combination patterns in which the number of candidates that take logical products becomes a maximum are searched for, and one of these patterns is determined as a data transfer combination for executing the data transfer. Therefore, it is possible to increase the data transfer capacity of the communication switching apparatus to the maximum.

Furthermore, when there are permutation combination patterns in which the number of candidates that take logical products becomes a maximum, one permutation combination pattern is selected using a round robin. Therefore, it is possible to select a combination of input and output lines in an even manner.

Furthermore, in the processing of comparing numbers of candidates at the time of searching for permutation combination patterns in which the number of candidates becomes a maximum, higher bits in comparison bits are used as the number of candidates, and lower bits are used as a comparison value for executing the round robin, and these comparison bits are collectively compared at the same time. Therefore, it is possible to execute these two types of comparison processes at the same time without taking a plurality of clock steps. As a result, it is possible to realize simplification of the circuit and high speed of the circuit.

According to the method for determining a combination of data to be transferred, as another aspect of this invention, the number of candidates in the data transfer request candidate data is counted for each row and each column as the number of candidates at lattice points of a lattice composed of N rows×N columns. A minimum value is searched for out of count values that are equal to or greater than 1 as a result of the counting, and one row or column that shows the minimum value is selected and stored. A minimum value is searched for out of numbers of candidates in columns or rows in which candidates exist, and one column or row that shows the minimum value is selected and stored, for the candidates in the selected row or column. All candidates on the row and candidates on the column determined are deleted, and these processing are repeated until no more candidates exist. Combinations of rows and columns stored at a point of time when no more candidates exist are determined as the data transfer combinations for executing the data transfer. Attention is paid to the number of candidates of transfer-waiting data that are deleted after one determination process is over, and a combination of input and output lines is determined so that this number becomes always minimum. Therefore, it is possible to maintain the data transfer capacity of the communication switching apparatus at a high level.

Moreover, when there are rows or columns that show a minimum value at the time of selecting a row or a column, the round-robin system is applied in order from rows to columns or from columns to rows, thereby to uniquely determine a row or a column that shows a minimum value. Therefore, it is possible to select a combination of input and output lines in an even manner.

Furthermore, in the processing of comparing numbers of candidates at the time of searching for permutation combination patterns in which the number of candidates becomes a minimum, higher bits in comparison bits are used as the number of candidates, and lower bits are used as a comparison value for executing the round robin, and these comparison bits are collectively compared at the same time. Therefore, it is possible to execute these two types of comparison processes at the same time without taking a plurality of clock steps. As a result, it is possible to realize simplification of the circuit and high speed of the circuit.

Moreover, when there are rows or columns that show a minimum value at the time of selecting a row or a column, a row of a smaller row number or a column of a smaller column number is preferentially selected, thereby to uniquely determine a row or a column that shows a minimum value. Therefore, even when there are rows or columns that show a minimum value, it is possible to select only one row or column that shows a minimum value.

Furthermore, when an external factor has occurred, the count number of a row or a column targeted by the external factor is replaced with a minimum value, thereby to increase the possibility of first selecting a specific row or column. Therefore, it is possible to preferentially select a predetermined input line or output line in a simple manner by only specifying a desired input line number or output line number.

Moreover, when an external factor has occurred, the count numbers of rows or columns other than a row or a column targeted by the external factor are replaced with 0, thereby to forcibly select a specific row or column. Therefore, it is possible to forcibly select a predetermined input line or output line in a simple manner by only specifying a desired input line number or output line number.

Furthermore, the data transfer combination processing is executed to lattices in order from lattices corresponding to higher priority classes to lattices corresponding to lower priority classes. Further, at the time of deleting all candidates on rows and columns that have been selected and determined, candidates on selected and determined rows and columns of lattices corresponding to the priority classes are deleted, and candidates on the selected and determined rows and columns of the lattices corresponding to all priority classes lower than the priority class are also deleted. Therefore, even when a plurality of priority classes relating to a processing order have been set, it is possible to execute a data switching while maintaining the data transfer capacity at a high level.

Moreover, when there are the same number of candidates at the time of searching for a minimum value, the numbers of candidates are sequentially compared for lattices including those corresponding to priority classes lower by one stage or a plurality of stages than the lattice corresponding to the priority class, thereby to determine a combination based on the status of candidates of lower priority classes. Therefore, it is possible to minimize the number of candidates that are deleted in one process. As a result, it is possible to increase the probability of selecting more candidates.

According to the method for determining a combination of data to be transferred, as still another aspect of this invention, the number of candidates in the data transfer request candidate data is counted for each row as the number of candidates at lattice points of a lattice composed of N rows×N columns. A minimum value is searched for out of count values that are equal to or greater than 1 as a result of the counting, and one row that shows the minimum value is selected and stored. For the candidates in the selected row, the number of candidates in each column in which candidates exist is counted. A minimum value is searched for out of the count values that are equal to or greater than 1 as a result of the counting, and one column that shows the minimum value is selected and stored. All candidates on the row and candidates on the column determined are deleted. The above series of processing are repeated until no more candidates exist. Combinations of rows and columns stored at a point of time when no more candidates exist are determined as the data transfer combinations for executing the data transfer. A combination of input and output lines is determined so that the number of candidates of transfer-waiting data that are deleted each time after one determination process is over becomes minimum. In each determination process, candidates in rows are selected first, and candidates in columns are selected next. Therefore, it is possible to select a column or a row that shows a minimum value, efficiently and at high speed, and at the same time, it is possible to maintain the data transfer capacity of the communication switching apparatus at a high level.

Furthermore, when there are rows and columns in which the number of candidates shows a minimum value at the time of selecting a row and a column respectively, a row and a column that show a minimum value are determined uniquely by using the round robin. Therefore, it is possible to select a combination of input and output lines in an even manner.

Moreover, in the processing of comparing numbers of candidates at the time of searching for permutation combination patterns in which the number of candidates becomes a minimum, higher bits in comparison bits are used as the number of candidates, and lower bits are used as a comparison value for executing the round robin, and these comparison bits are collectively compared at the same time. Therefore, it is possible to execute these two types of comparison processes at the same time without taking a plurality of clock steps. As a result, it is possible to realize simplification of the circuit and high speed of the circuit.

Furthermore, when there are rows and columns that show a minimum value at the time of selecting a row and a column respectively, a row of a smaller row number and a column of a smaller column number are preferentially selected, thereby to uniquely determine a row and a column that show a minimum value. Therefore, even when there are rows or columns that show a minimum value, it is possible to select only one row or column that shows a minimum value.

Moreover, when an external factor has occurred, the count number of a row or a column targeted by the external factor is replaced with a minimum value, thereby to increase the possibility of first selecting a specific row or column. Therefore, it is possible to preferentially select a predetermined input line or output line in a simple manner by only specifying a desired input line number or output line number.

Furthermore, when an external factor has occurred, the count numbers of rows or columns other than a row or a column targeted by the external factor are replaced with 0, thereby to forcibly select a specific row or column. Therefore, it is possible to forcibly select a predetermined input line or output line in a simple manner by only specifying a desired input line number or output line number.

Moreover, the data transfer combination processing is executed to lattices in order from lattices corresponding to higher priority classes to lattices corresponding to lower priority classes. Further, at the time of deleting all candidates on rows and columns that have been selected and determined, candidates on selected and determined rows and columns of lattices corresponding to the priority classes are deleted, and candidates on the selected and determined rows and columns of the lattices corresponding to all priority classes lower than the priority class are also deleted. Therefore, even when priority classes relating to a processing order have been set, it is possible to execute a data switching while maintaining the data transfer capacity at a high level.

Furthermore, when there are the same number of candidates at the time of searching for a minimum value, the numbers of candidates are sequentially compared for lattices including those corresponding to priority classes lower by one stage or a plurality of stages than the lattice corresponding to the priority class, thereby to determine a combination based on the status of candidates of lower priority classes. Therefore, it is possible to minimize the number of candidates that are deleted in one process. As a result, it is possible to increase the probability of selecting more candidates.

According to the combination determining circuit as still another aspect of this invention, the circuit comprises the AND circuit that obtains logical products of the data transfer request candidate data of N×N bits and permutation combination data of N×N bits that expresses all permutation combination patterns from 1 to N respectively, and the number calculating section that calculates the number of candidates that take logical products, for each of the plurality of permutation combination patterns. The combination determining circuit also comprises the search determining circuit that compares a plurality of outputs of the number calculating section, thereby to search for permutation combination patterns in which the number of candidates becomes a maximum, and determines one of these patterns as a data transfer combination for executing the data transfer. Confirmation is carried out in tournament with all patterns of permutation combinations as the factorial of N. Therefore, it is possible to increase the data transfer capacity of the switching apparatus to the maximum.

Moreover, the search determining circuit has the round-robin circuit that selects one permutation combination pattern using a round robin, when there are permutation combination patterns in which the number of candidates becomes a maximum. Therefore, it is possible to select a combination of input and output lines in an even manner.

Furthermore, the search determining circuit has the comparator that uses higher bits in comparison bits as the number of candidates, uses lower bits as a comparison value for executing the round robin, and collectively compares these comparison bits at the same time, thereby to select only permutation combination patterns in which the number of candidates becomes a maximum. Therefore, it is possible to execute two types of comparison processes at the same time without taking a plurality of clock steps. As a result, it is possible to realize simplification of the circuit and high speed of the circuit.

According to the combination determining circuit as still another aspect of this invention, the circuit comprises the row candidate number calculating section, row minimum value comparator, selected row and non-selected column candidate deleting section, column candidate number calculating section, column minimum value comparator, selection result storing register, and the selected row and column candidate deleting section. A combination of input and output lines is determined so that the number of candidates of transfer-waiting data that are deleted each time after one determination process is over becomes minimum. In each determination process, candidates in rows are selected first, and candidates in columns are selected next. Therefore, it is possible to select a column or a row that shows a minimum value, efficiently and at high speed, and at the same time, it is possible tomaintain the data transfer capacity of the communication switching apparatus at a high level.

Moreover, the row minimum value comparator and the column minimum value comparator respectively have round-robin circuits that uniquely determine a row that shows a minimum value when there are rows and columns that show a minimum value using the round robin. Therefore, it is possible to select a combination of input and output lines in an even manner.

Furthermore, in each comparison processing, each of the row minimum value comparator and the column minimum value comparator uses higher bits in comparison bits as the number of candidates, and uses lower bits as a comparison value for executing the round robin, and collectively compares these comparison bits at the same time. Therefore, it is possible to execute two types of comparison processes at the same time without taking a plurality of clock steps. As a result, it is possible to realize simplification of the circuit and high speed of the circuit.

Moreover, when there are rows and columns that show a minimum value, the row minimum value comparator and the column minimum value comparator uniquely determine a row and a column that show a minimum value by preferentially selecting a smaller row number. Therefore, even when there are rows or columns that show a minimum value, it is possible to select only one row or column that shows a minimum value with a simple structure.

Furthermore, the specified row preferentially selecting section replaces a row corresponding to a row specified by an external input signal with a minimum value, out of a result of counting a plurality of rows by the row candidate number calculating section, and inputs the replaced value into the row minimum value comparator. The specified column preferentially selecting section replaces a column corresponding to a column specified by an external input signal with a minimum value, out of a result of counting a plurality of columns by the column candidate number calculating section, and inputs the replaced value into the column minimum value comparator. Therefore, it is possible to preferentially select a predetermined input line or output line in a simple manner by only specifying a desired input line number or output line number.

Moreover, a result of counting a row corresponding to a row specified by an external input signal, out of a result of counting a plurality of rows by the row candidate number calculating section, is input straight into the row minimum value comparator, and a result of counting rows other than the specified row is replaced with 0. Further, a result of counting a column corresponding to a column specified by an external input signal, out of a result of counting a plurality of columns by the column candidate number calculating section, is input straight into the column minimum value comparator, and a result of counting columns other than the specified column is replaced with 0. Therefore, it is possible to forcibly select a predetermined input line or output line in a simple manner by only specifying a desired input line number or output line number.

According to the combination determining circuit as still another aspect of this invention, the circuit comprises the selected row and column candidate deleting section, class selecting section, row candidate number calculating section, row minimum value comparator, selected row and non-selected column candidate deleting section, column candidate number calculating section, column minimum value comparator, and the selection result storing register. A combination of input and output lines is determined so that the number of candidates of transfer-waiting data that are deleted each time after one determination process is over becomes minimum. Therefore, when priority classes relating to a processing order have been set, it is possible to select a column or a row that shows a minimum value, efficiently and at high speed, and at the same time, it is possible to maintain the data transfer capacity of the communication switching apparatus at a high level.

Furthermore, in the row minimum value comparator and the column minimum value comparator, when there are the same number of candidates at the time of searching for a minimum value, the numbers of candidates are sequentially compared for lattices including those corresponding to priority classes lower by one stage or a plurality of stages than the lattice corresponding to the priority class, thereby to select a row and a column that show a minimum value respectively. Therefore, it is possible to minimize the number of candidates that are deleted in one process. As a result, it is possible to increase the probability of selecting more candidates.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method for determining a combination of data to be transferred at the time of transferring the data from N input lines to N output lines by using transfer request candidate data that shows candidates of data transfer requests in the N input lines with respect to the N output lines, the method comprising:

a first step of expressing the data transfer request candidate data in N×N bits, and obtaining logical products of the data transfer request candidate data of N×N bits and permutation combination data of N×N bits that expresses all permutation combination patterns from 1 to N respectively; and a second step of searching for permutation combination patterns in which a number of candidates that take logical products becomes a maximum, and determining one of these patterns as a combination of data for transfer used when the data transfer is executed.

2. The method according to claim 1, wherein the second step comprises, when there are a plurality of permutation combination patterns in which the number of candidates that take logical products becomes a maximum, selecting one permutation combination pattern using a round robin.

3. The method according to claim 2, wherein the second step further comprises, in the processing of comparing numbers of candidates at the time of searching for permutation combination patterns in which the number of the candidates becomes a maximum, using higher bits in comparison bits as the number of candidates, and using lower bits as a comparison value for executing the round robin to collectively compare these comparison bits at the same time.

4. A method for determining a combination of data to be transferred at the time of transferring the data from N input lines to N output lines by using transfer request candidate data that shows candidates of data transfrr requests in the N input lines with respect to the N output lines, the method comprising:

a first step of counting for each row and each column a number of candidates in the data transfer request candidate data as a count value of the number of candidates at lattice points of a lattice composed of N rows×N columns;

a second step of searching for a minimum value out of the count values that are equal to or greater than 1 as a result of the counting, and selecting and storing one row or column that shows the minimum value;

regarding candidates in the selected row or column, a third step of searching for a minimum value out of numbers of candidates in columns or rows in which the candidates exist, and selecting and storing one column or row that shows the minimum value; and a fourth step of deleting all candidates on the row and candidates on the column determined in the second step and the third step, wherein the first to fourth steps are repeated until no more candidates exist, and wherein combinations of rows and columns stored at a point of time when no more candidates exist are determined as combinations of data for transfer used when the data transfer is executed.

5. The method according to claim 4, wherein the second or third step comprises, when there are a plurality of rows or columns that show the minimum value at a time of selecting a row or a column, applying a round-robin system in order from rows to columns or from columns to rows to uniquely determine the row or the column that shows a the minimum value.

6. The method according to claim 5, wherein the second or third step comprises, when there are the plurality of rows or columns that show the minimum value at the time of selecting the row or the column, using higher bits in comparison bits as the number of candidates, and using Tower bits as a comparison value for executing the round robin to collectively compare these comparison bits at the same time.

7. The method according to claim 4, wherein the first step comprises, when an external factor has occurred, replacing the count number of a row or a column targeted by the external factor, with the minimum value to increase possibility of first selecting a specific row or column.

8. The method according to claim 4, wherein the first step comprises, when an external factor has occurred, replacing the count numbers of rows or columns other than a row or a column targeted by the external factor, with 0 to forcibly select the row or the column targeted by the external factor.

9. The method according to claim 4 further comprising:

preparing the transfer request candidate data that shows the candidates of data transfer requests in the N input lines with respect to the N output lines, by a plurality of sets corresponding to a plurality of priority classes relating to a processing order;

applying the method to data transfer in which the plurality oil priority classes are handled, the plurality of priority classes in which a condition for selecting a candidate from among a plurality of sets of lattices is that one candidate that can be selected from the same row of all lattices and from the same column of all the lattices; and sequentially executing the repetitive processing in the first to fourth steps to lattices in order from lattices corresponding to higher priority classes to lattices corresponding to lower priority classes, wherein the fourth step includes deleting candidates on rows and candidates on columns of lattices corresponding to the priority classes determined in the second step and the third step; and deleting candidates on the determined rows and candidates on the determined columns of the lattices corresponding to all priority classes lower than the priority classes.

10. The method according to claim 9, wherein in the second and third steps, when there are a same number of candidates at the time of searching for the minimum value, the numbers of candidates are sequentially compared for lattices including those corresponding to priority classes lower by one stage or a plurality of stages than the lattice corresponding to the priority class to determine a combination based on the status of candidates of lower priority classes.

11. A method for determining a combination of data to be transferred at the time of transferring data from N input lines to N output lines by using transfer request candidate data that shows candidates of data transfer requests in the N input lines with respect to the N output lines, the method comprising:

a first step of counting for each row a number of the candidates in the data transfer request candidate data as a count value of the number of candidates at lattice points of a lattice composed of N rows×N columns;

a second step of searching for a minimum value out of the count values that are equal to or greater than 1 as a result of the counting, and selecting and storing one row that shows the minimum value;

regarding the candidates in the selected row, a third step of counting a number of the candidates in each column in which the candidates exist;

a fourth step of searching for a minimum value out of count values that are equal to or greater than 1 as a result of the counting in the third step, and selecting and storing one column that shows the minimum value; and a fifth step of deleting all candidates on the row and candidates on the column determined in the second step and the fourth step, wherein the first to fifth steps are repeated until no more candidates exist, and wherein combinations of rows and columns stored at a point of time when no more candidates exist are determined as combinations of data for transfer used when the data transfer is executed.

12. The method according to claim 11, wherein in the second and forth steps, when there are a plurality of rows and columns in which the number of candidates shows the minimum value at the time of selecting a row and a column respectively, a row and a column that show the minimum value are determined uniquely by using the round robin.

13. The method according to claim 12, wherein in the second and fourth steps, when there are the plurality of rows and columns in which the number of candidates shows the minimum value at the time of selecting the row and the column respectively, higher bits in comparison bits are used as the number of candidates, and lower bits are used as a comparison value for executing the round robin, and these comparison bits are collectively compared at the same time.

14. The method according to claim 11, wherein the first step or the third step comprises, when an external factor has occurred, replacing the count number of a row or a column targeted by the external factor, with the minimum value to increase the possibility of first selecting a specific row or column.

15. The method according to claim 11, wherein the first step or the third step comprises, when an external factor has occurred, replacing the count numbers of rows or columns other than a row or a column targeted by the external factor, with 0 to forcibly select the row or the column targeted by the external factor.

16. The method according to claim 11 further comprising:

preparing the transfer request candidate data that shows the candidates of data transfer requests in the N input lines with respect to the N output lines, by a plurality of sets corresponding to a plurality of priority classes relating to a processing order;

applying the method to data transfer handling the plurality of priority classes in which a condition fbr selecting a candidate from among the plurality of sets of lattices is that one candidate that can be selected from the same row of all lattices and from the same column of all the lattices; and sequentially executing the repetitive processing in the first to fifth steps to lattices in order from lattices corresponding to higher priority classes to lattices corresponding to lower priority classes, and the fifth step including deleting candidates on rows and candidates on columns of lattices corresponding to the priority classes determined in the second step and the fourth step; and deleting candidates on the determined rows and candidates on the determined columns of the lattices corresponding to all priority classes lower than the priority class.

17. The method according to claim 16, wherein in the second and fourth steps, when there are a same number of candidates at the time of searching for the minimum value, the numbers of candidates are sequentially compared for lattices including those corresponding to priority classes lower by one stage or a plurality of stages than the lattice corresponding to the priority class to determine a combination based on the status of candidates of lower priority classes.

18. A combination determining circuit that determines a combination of data to be transferred at the time of transferring data from N input lines to N output lines by using transfer request candidate data that shows candidates of data transfer requests in the N input lines with respect to the N output lines, the combination determining circuit comprising:

an AND circuit that obtains logical products of the data transfer request candidate data of N×N bits and permutation combination data of N×N bits that expresses all permutation combination patterns from 1 to N respectively;

a number calculating unit that calculates the number of candidates that take logical products, for each of the plurality of permutation combination patterns; and a search determining circuit that compares a plurality ot outputs of the number calculating unit, thereby to search for permutation combination patterns in which the number of candidates becomes a maximum, and determines one of these patterns as a combination of data to be transferred when the data to be transferred.

19. The combination determining circuit according to claim 18, wherein the search determining circuit has a round-robin circuit that selects one permutation combination pattern using a round robin, when there are a plurality of permutation combination patterns in which the number of candidates becomes a maximum.

20. The combination determining circuit according to claim 19, wherein the search determining circuit has a comparator that uses higher bits in comparison bits as the number of candidates, uses lower bits as a comparison value for executing the round robin, and collectively compares these comparison bits at the same time, thereby to select one permutation combination pattern in which the number of candidates becomes a maximum.

21. A combination determining circuit that determines a combination of data to be transferred at the time of transferring data from N input lines to N output lines by using transfer request candidate data that shows candidates of data transfer requests in the N input lines with respect to the N output lines, the combination determining circuit comprising:

a selected row and column candidate deleting unit that deletes candidates in the row and the column that are the same as the row and the column specified in a result of the last determination of combinations, from the data transfer request candidate data of N×N bits;

a row candidate number calculating unit that counts for each row the number of candidates in the output data of the selected row and column candidate deleting unit as the number of candidates at lattice points of N rows×N columns;

a row minimum value comparator that searches for a minimum value equal to or greater than 1 out of a result of the counting in the row candidate number calculating unit, and selects one row that shows the minimum value;

a selected row and non-selected column candidate deleting unit that deletes candidates in columns in which the selected row has no candidates from the output data of the selected row and column candidate deleting unit based on the row selected by the row minimum value comparator;

a column candidate number calculating unit that counts for each column the number of candidates in each column, based on output data of the selected row and non-selected column candidate deleting unit;

a column minimum value comparator that searches for a minimum value equal to or greater than 1 out of a result of the counting of the column candidate number calculating unit, and selects one row that shows the minimum value; and a selection result storing register that stores selection results in the row minimum value comparator and the column minimum value comparator respectively, and inputs the results to the selected row and column candidate deleting unit as a result of the last determination of a combination, wherein when each selection result of the row minimum value comparator and the column minimum value comparator has been input to the selection result storing register by maximum N sets, data stored in the selection result storing register is output as a result of a final combination of data to be transferred.

22. The combination determining circuit according to claim 21, wherein the row minimum value comparator has a first round-robin circuit that uniquely determines a row that shows a minimum value using a round robin when there are a plurality of rows that show a minimum value, and the column minimum value comparator has a second round-robin circuit that uniquely determines a column that shows a minimum value using the round robin when there are a plurality of columns that show a minimum value.

23. The combination determining circuit according to claim 22, wherein in comparison processing, each of the row minimum value comparator and the column minimum value comparator uses higher bits in comparison bits as the number of candidates, and uses lower bits as a comparison value for executing the round robin, and collectively compares these comparison bits at the same time.

24. The combination determining circuit according to claim 21, further comprising:

a specified row preferentially selecting unit that replaces a row corresponding to a row specified by an external input signal out of a result of counting a plurality of rows by the row candidate number calculating unit, with a minimum value, and inputs the value into the row minimum value comparator; and a specified column preferentially selecting unit that replaces a column corresponding to a column specified by an external input signal out of a result of counting a plurality of columns by the column candidate number calculating unit, with a minimum value, and inputs the value into the column minimum value comparator.

25. The combination determining circuit according to claim 21, further comprising:
a unit that inputs a result of counting a row corresponding to a row specified by an external input signal out of a result of counting a plurality of rows by the row candidate number calculating unit, straight into the row minimum value comparator, and replaces a result of counting rows other than the specified row with 0; and
a unit that inputs a result of counting a column corresponding to a column specified by an external input signal out of a result of counting a plurality of columns by the column candidate number calculating unit, straight into the column minimum value comparator, and replaces a result of counting columns other than the specified column with 0.

26. A combination determining circuit that determines a combination of data to be transferred at the time of transferring data from N input lines to N output lines, by preparing transfer request candidate data, indicating candidates of data transfer request in the N input lines with respect to the N output lines, by a plurality of sets of the transfer request candidate data, corresponding to a plurality of priority classes relating to a processing order, and that is applied to data transfer in which a plurality of priority classes are handled, the plurality of priority classes in which one candidate can be selected from the same row and from the same column of all the sets of the transfer request candidate data, the combination determining circuit comprising:
a selected row and column candidate deleting unit that deletes candidates in input lines and output lines that are the same as the input lines and the output lines specified by a result of the last determination of combinations in all priority classes including the priority class specified by the result of the last combination determination and all lower priority classes than this priority class, from the data transfer request candidate data of a plurality of priority classes;
a class selecting unit that repeatedly executes operation of selecting data transfer request candidate data for at least one priority class from the output of the selected row and column candidate deleting unit, and of outputting the selected data transfer request candidate data together with class data indicating a selected priority class, in order from a higher priority class to a lower priority class, each time when a combination of data to be transferred in each priority class is determined;
a row candidate number calculating unit that counts for each row the number of candidates in the data transfer request candidate data in one priority class output from the class selecting unit, as the number of candidates at lattice points of a lattice composed of N rows×N columns;
a row minimum value comparator that searches for a minimum value equal to or greater than 1 out of a result of the counting in the row candidate number calculating unit, and selects one row that shows the minimum value;
a selected row and non-selected column candidate deleting unit that deletes candidates in columns in which the selected row has no candidates, from the data transfer request candidate data of one priority class output from the class selecting unit, based on the row selected by the row minimum value comparator;
a column candidate number calculating unit that counts for each column the number of candidates in each column, based on the output data of the selected row and non-selected column candidate deleting unit;
a column minimum value comparator that searches for a minimum value equal to or greater than 1 out of a result of the counting in the column candidate number calculating unit, and selects one row that shows the minimum value; and
a selection result storing register that stores selection results of the row minimum value comparator and the column minimum value comparator respectively together with the class selection data from the class selecting unit, and inputs the output to the selected row and column candidate deleting unit as a result of the last combination determination,
wherein final data stored in the selection result storing register is output as a result of the data transfer combination.

27. The combination determining circuit according to claim 26, wherein when there are the same number of candidates at the time of searching for a minimum value, the row minimum value comparator and the column minimum value comparator sequentially compare the numbers of candidates for lattices including those corresponding to priority classes lower by one stage or a plurality of stages than the lattice corresponding to the priority class to select a row and a column that show a minimum value respectively.

28. The method according to claim 1, wherein an actual number of input lines in Nin and an actual number of output lines is Nout and N is max(Nin, Nout).

29. The combination determining circuit according to claim 21, wherein an actual number of input lines in Nin and an actual number of output lines is Nout and N is max (Nin, Nout).

30. A method for determining a combination of data to be transferred at a time of transferring the data from N input lines to N output lines by using transfer request candidate data represented as a lattice of N rows×N columns, the method comprising:
(1) selecting, among all rows with at least one transfer request candidate, a row with a minimum number of transfer request candidates in a row direction;
(2) selecting, among all columns of the row selected in step (1) with a corresponding transfer request candidate, a column with a minimum number of transfer request candidates in a column direction;
(3) storing the row and the column selected in steps (1) and (2);
(4) deleting all candidates of the row and the column selected in steps (1) and (2);
(5) repeating steps (1), (2), (3) and (4) until all candidates are deleted; and
(6) determining, as the combination of the data to be transferred, a combination of the selected rows and columns stored when step (5) is completed.

31. The method according to claim 30,
wherein step (1) comprises:
(1.1) determining a row count value for each row, wherein the row count value is the number of transfer request candidates of the row; and
(1.2) selecting, among all rows with row count values of at least one, a row with a minimum row count value, wherein the minimum row count value is the minimum number of transfer request candidates in the row direction, and wherein step (2) comprises:
- (2.1) determining a column count value for each column of the row selected in step (1.2) with a corresponding transfer request candidate, wherein the column count value is the number of transfer request candidates of the column; and
- (2.2) selecting, among all columns with column count values of at least one, a column with a minimum column count value, wherein the minimum column count value is the minimum number of transfer request candidates in the column direction.

32. The method according to claim 31, wherein step (1.2) comprises:
- (1.2.1) determining whether there are a plurality of rows with the minimum row count value; and
- (1.2.2) applying a round-robin selection process among the plurality of rows to select the row when it is determined in step (1.1) that there are the plurality of rows with the minimum row count value.

33. The method according to claim 31, wherein step (2.2) further comprises:
- (2.2.1) determining whether there are a plurality of columns with the minimum column count value; and
- (2.2.2) applying a round-robin selection process among the plurality of columns to select the column when it is determined in step (2.1) that there are the plurality of columns with the minimum column count value.

34. The method according to claim 31, further comprising:
- (7) determining whether a particular row is targeted by an external factor; and
- (8) setting the row count value of the particular row to the minimum row count value prior to performing step (1.2) when it is determined in step (7) that the particular row is targeted by the external factor.

35. The method according to claim 31, further comprising:
- (9) determining whether a particular row is targeted by an external factor; and
- (10) setting the row count values of the rows other than the particular row to a value less than one prior to performing step (1.2) when it is determined in step (9) that the particular row is targeted by the external factor.

* * * * *